United States Patent [19]

Gai

[11] Patent Number: 5,386,244
[45] Date of Patent: Jan. 31, 1995

[54] BRIGHTNESS SIGNAL/COLOR SIGNAL SEPARATION FILTER INCLUDING AN IMAGE CORRECTION JUDGING CIRCUIT

[75] Inventor: Toshihiro Gai, Nagaokakyo, Japan

[73] Assignee: Mitsubishi Denki Kabushiki Kaisha, Tokyo, Japan

[21] Appl. No.: 193,360

[22] Filed: Feb. 3, 1994

Related U.S. Application Data

[63] Continuation of Ser. No. 3,946, Jan. 19, 1993, abandoned, which is a continuation of Ser. No. 825,786, Jan. 21, 1992, abandoned, which is a continuation of Ser. No. 623,088, Dec. 6, 1990, abandoned.

[30] Foreign Application Priority Data

Dec. 8, 1989 [JP] Japan .................................. 1-319550
Mar. 14, 1990 [JP] Japan .................................. 2-63131
Jul. 11, 1990 [JP] Japan .................................. 2-184640

[51] Int. Cl.$^6$ ............................................. H04N 9/78
[52] U.S. Cl. ........................................ 348/610; 348/668
[58] Field of Search ........ 348/610, 617, 619, 664–668, 348/713

[56] References Cited

U.S. PATENT DOCUMENTS

| | | | |
|---|---|---|---|
| 4,305,091 | 12/1981 | Cooper | 358/36 |
| 4,573,070 | 2/1986 | Cooper | 358/36 |
| 4,707,132 | 11/1987 | Matono et al. | |
| 4,754,322 | 6/1988 | Okuda et al. | 358/31 |
| 4,789,890 | 12/1988 | Ito et al. | 358/31 |
| 4,803,547 | 2/1989 | Stratton | 358/31 |
| 4,954,885 | 9/1990 | Ito et al. | 358/31 |
| 4,994,906 | 2/1991 | Moriwake | 358/31 |
| 5,225,899 | 7/1993 | Park | 358/31 |

FOREIGN PATENT DOCUMENTS

| | | |
|---|---|---|
| 26677A1 | 2/1986 | Germany . |
| 28699A1 | 2/1986 | Germany . |
| 61-18285 | 1/1986 | Japan . |
| 63-232594 | 9/1988 | Japan . |
| 2226207A | 6/1990 | United Kingdom . |
| 2241403 | 8/1991 | United Kingdom . |

OTHER PUBLICATIONS

WPI Abstract Acc No 91-099021/14 & JP 03044188 A (Mitsubishi) 26 Feb. 1991—see abstract.
WPI Abstract Acc No 89-125082/17 & JP 01069193 A (Mitsubishi) see abstract.
WPI Abstract Acc No 89-125081/17 & JP 01069192 A (Mitsubishi) see abstract.
John P. Rossi, "Digital TV Comb Filter with Adaptive Features", IERE Conf. Proc. pp. 267-282 (1976).
John P. Rossi, "Digital Television Image Enhancement" J. Smpte, vol. 84, Jul. (1985).
"IDTV Receiver", Consumer Electronics, vol. CE-33, Aug. 1987, No. 3, pp. 181-191.
NTSC Y/C Separation and Enhancement Technique with Two Dimensional Adaptive Features to M. Itoga et al, IEEE Transactions on Consumer Electronics, vol. 34, No. 1, Feb. 1988.

Primary Examiner—Stephen Brinich

[57] ABSTRACT

A filter for separating brightness signal and color signal from a composite color signal of NTSC type or PAL type, includes a horizontal color signal extracting filter, a vertical color signal extracting filter, a horizontal/vertical color signal extracting filter, a switching circuit, and an image correlation judging circuit. The image correlation judging circuit makes the switching circuit select: the color signal extracted by the horizontal color signal extracting filter when the horizontal correlation is judged to be stronger than the sampling value at the target sampling point; the color signal extracted by the vertical color signal extracting filter when the vertical correlation is judged to be stronger than the same; and the color signal extracted by the horizontal/vertical color signal extracting filter when neither of them is judged to be stronger than the same. The result is that mutual leakage of the brightness signal and the color signal at the area of intensive change into the another's channel can be reduced, thereby avoiding dot jamming and deterioration of image quality. The image correlation judging circuit judges the strength of correlation based on the non-correlative energy.

50 Claims, 18 Drawing Sheets

BRIGHTNESS SIGNAL/COLOR SIGNAL SEPARATION FILTER INCLUDING AN IMAGE CORRECTION JUDGING CIRCUIT

This application is a continuation of application Ser. No. 08/003,946 filed on Jan. 19, 1993, now abandoned which is a continuation of application Ser. No.: 07/825,786 filed on Jan. 21, 1992, now abandoned, which is a continuation application of Ser. No.: 07/623,088 filed on Dec. 6, 1990, now abandoned.

BACKGROUND OF THE INVENTION

1. Field of the Invention

This invention relates to a brightness signal/color signal separating filter, and more particularly to an improvement thereof which separates brightness signal and color signal from a composite television signal, of e.g. NTSC (National Television System Committee) type or PAL (Phase Alternate Line) type, in dependence upon the magnitude of detected vertical or horizontal correlative energy of the composite television signal.

2. Description of the Related Art

FIG. 16 of the accompanying drawings is a block diagram showing an example of conventional brightness signal/color signal separating filter. In FIG. 16, the numerals respectively designate: 111, an input terminal for inputting NTSC type composite color television signal; 2, an A/D converter for converting an analog composite color television signal into a digital signal; 3 and 4, a first and a second one line delay circuit; 5, compensating delay circuit; 6, a vertical filter; 7, a band pass filter; 8 and 10, output terminals; and 9, subtracting circuit.

In operation, the composite color television signal inputted to the input terminal 111 enters the A/D converter 2, the output digital signals of which are supplied to both the first one line delay circuit 3 and the vertical filter 6.

One output of the first one line delay circuit 3 is directly supplied to the vertical filter 6, while another output is delayed by one line in the second one line delay circuit 4 and thereafter supplied to the vertical filter 6.

The vertical filter 6 is generally referred to as a two line type comb-shaped filter, the output of which is fed to the band pass filter 7.

The band pass filter 7 outputs color signals 205, one to the output terminal 8, and another to one input terminal of the subtracting circuit 9. The other input terminal of the subtracting circuit 9 receives the output of the first one line delay circuit 3 through a compensating delay circuit 5 which compensates the amount delayed in the band pass filter 7. The subtracting circuit 9 then outputs a brightness signal 207 to the output terminal 10.

It will now be explained how the above-mentioned filter functions on the NTSC type composite color television signal. The input signal 201 of the composite color television signal having been simultaneously sampled by the color subcarrier with the sampling frequency fs=4*fsc (fsc: a color subcarrier frequency which is approximately 3.58 MHz in NTSC type, while approximately 4.43 MHz in PAL type) would be displayed in two-dimentional arrangement on the screen as shown in FIG. 17.

Namely, with fsc=(455/2)*fH (fH: horizontal frequency: approximately 15.7 kHz in NTSC and 15.6 kHz in PAL), the phase of the color signal C inverts by 180 degrees per line, resulting in 4 samples at each cycle. Here, assuming that the codes Y and C1, C2 designate brightness signal and color signals respectively in the drawing, the white circle, the slashed circle, the white triangle, and the slashed triangle represent Y+C1, Y−C1, Y+C2, and Y−C2, respectively.

When $Z^{-1}$ by Z-conversion is used as a code for representing the delay by one sample, it would be expressed as $Z^{-1}=\exp(-j\,2\pi f/4\,fsc)$. Then, a delay by one line $Z^{-l}$ becomes $Z^{-l}=\exp(-j\,2\pi f/fH)=\exp(-j2\pi fl/4\,fsc)$, resulting in l=910 upon Fsc=4*(455/2)*FH.

At this time, the vertical filter 3 extracts a line aiding signal 204, for aiding per each line including the color signal, from the one line delay signal and the two line delay signal which are delayed by the first and second one line delay circuit 3 and 4, and from the current input signal 201. The transmission function Hv (Z) of the vertical filter 6 can be expressed as $Hv(Z)=(-\frac{1}{4})*(1-Z^{-l})^2$.

In other words, the line aiding signal Hc (m, n) at the coordinates (m, n) on the screen shown in FIG. 17 is sampled as $Hc(m, n)=-(\frac{1}{4})*\{S(m, n-1)-2S(m, n)+S(m, n+1)\}$. Since the line aiding signal contains the brightness signal Y too, the color signal C (m, n) being high frequency component is separated from the line aiding signal Hc (m, n) by the band pass filter 7. The resulting color signal 205 will be supplied to the subtracting circuit 9.

In this case, the transmission function of the band pass filter 7 can be composed, for example, as $Hh(Z)=(-1/32)*(1-Z^{-2})^2*(1+Z^{-4})^2*(1+Z^{-8})$.

The one line delay signal 202 is delayed, in accordance with the delaying amount of the band pass filter 7, by the compensating delay circuit 5. The subtracting circuit 9 subtracts the color signal C (m, n) from the signal S (m, n), and thereby extracts the brightness signal Y (m, n) as Y (m, n)=S (m, n)−C (m, n).

As described above, in the conventional brightness signal/color signal separating filter, the characteristics of the vertical filter and the horizontal filter have been fixedly combined. Namely, the brightness signal/color signal separating process has been performed, in both the vertical and the horizontal directions, by a band pass filter.

Consequently, in regions where the brightness and the color of the image greatly change, the brightness signal and the color signal have mutually leaked into the other's channel, causing a degraded reproductive image by e.g. dot interference.

SUMMARY OF THE INVENTION

It is therefore an object of this invention to provide a brightness signal/color signal separating filter which is capable of accurately separating a brightness signal and a color signal from a composite color television signal of e.g. NTSC type or PAL type, even when intensive change in brightness and color of an image takes place.

According to this invention, a brightness signal/color signal separating filter for separating the brightness signal and color signal from composite color television signal, comprises:

a first delay circuit for outputting a first delay composite television signal generated by delaying an input composite color signal by a predetermined number of lines;

a second delay circuit for outputting a second delay composite color television signal generated by further delaying the composite color signal delayed by said first delay circuit by the same number of lines as in said first delay circuit;

a vertical color signal extracting filter for extracting vertical color signal from the input composite color television signal, first delay composite color television signal, and second delay composite color television signal;

a horizontal color signal extracting filter for extracting horizontal color signal from the first delay composite color television signal;

a horizontal/vertical color signal extracting filter for extracting horizontal and vertical color signals from said input, first delay and second delay composite color television signals;

a switching circuit for selectively outputting any one of outputs from said vertical color signal extracting filter, horizontal color signal extracting filter, and horizontal/vertical color signal extracting filter; and an image correlation judging circuit for comparatively judging correlation of an image by said input first delay and second delay composite color television signals in the vertical and horizontal directions, and for outputting horizontal color signal when the horizontal correlation is strong, for outputting vertical color signal when vertical correlation is strong and the horizontal correlation is weak, and for outputting both horizontal and vertical color signals when both the horizontal and vertical correlations are weak, respectively, from said switching circuit;

said image correlation judging circuit including:

a) a non-correlative energy extracting circuit for extracting horizontal color signal non-correlative energy representative of correlative strength of the horizontal color signal, horizontal brightness signal non-correlative energy representative of correlative strength of the horizontal brightness signal, vertical color signal non-correlative energy representative of correlative strength of the vertical color signal, and vertical brightness signal non-correlative energy representative of correlative strength of the vertical brightness signal;

b) comparative signal generating means for generating four comparative signals representative of vertical and horizontal correlative strength of the composite color television signal, one based on horizontal color signal non-correlative energy, horizontal brightness signal non-correlative energy, vertical color signal non-correlative energy, and vertical brightness signal non-correlative energy, respectively;

c) comparative judging means for comparatively judging the horizontal and vertical correlative strengths of the composite color television signal, and for ordering said switching circuit to output horizontal color signal extracted by the horizontal color signal extracting circuit when the horizontal correlation is strong vertical color signal extracted by the vertical color signal extracting filter when vertical correlation is stronger than horizontal correlation, and horizontal/vertical color signals extracted by the horizontal/vertical color signal extracting filter when both the horizontal and vertical correlations are weak.

In the brightness signal/color signal separating filter of this invention mentioned above, composite color television signals of NTSC type or PAL type are sequentially delayed in the first delay circuit and the second delay circuit by a predetermined number of lines. The numbers of lines for delaying process in the first delay circuit and the second delay circuit are identical. Namely, on the basis of the first delayed composite color television signal obtained by the first delay circuit, the composite color television signal on the screen, before being delayed, is displayed prior to the composite color television signal delayed by the first delay circuit by a predetermined number of lines, and the composite color television signal delayed by the second delay circuit is displayed after the composite color television signal delayed by the first delay circuit by the same number of lines.

These three kinds of composite color television signals are then supplied to the vertical color signal extracting filter and the horizontal/vertical color signal extracting filter. Particularly the first delayed composite color television signal is additionally supplied to the horizontal color signal extracting filter.

The vertical color signal extracting filter extracts vertical color signal. In this case, "vertical" means the direction perpendicular to the lines. Therefore, the three types of composite color television signals are necessary for the extraction of the vertical color signal by the vertical color signal extracting filter.

The horizontal color signal extracting filter extracts horizontal color signal. In this circuit, among the three types of composite color television signals, only the one corresponding to the intermediate line i.e. the composite color television signal delayed by the first delay circuit is used, since a signal which belongs to an identical line will suffice.

The horizontal/vertical color signal extracting filter extracts color signals in the vertical and horizontal directions.

The color signals extracted by these three types of filters are then supplied to the switching circuit. The switching circuit selectively outputs any of the color signal depending on the result of a comparative judgment carried out in the image correlation judging circuit. The image correlation judging circuit lets the switching circuit selectively output: the horizontal color signal when horizontal correlation is strong; the vertical color signal when the horizontal correlation is weak and the vertical correlation is strong; and vertical and horizontal color signals when both the horizontal and vertical correlations are weak.

As a result, even when there is intensive color etc. changes arising in composite color television signals, it is possible to output color signals surely separated on the basis of the correlative judgment result.

A further significant feature of this invention lies in the composition and the function of the image correlation judging circuit.

The image correlation judging circuit performs the correlation judgment and controls the switching circuit in the following order of procedure: extraction of non-correlative energy—generation of comparative signal—comparative analysis based on the comparative signal.

For a start, the non-correlative energy extracting means extracts horizontal color signal non-correlative energy, horizontal brightness signal non-correlative energy, vertical color signal non-correlative energy, and vertical brightness signal non-correlative energy, representative of the weakness of the horizontal color signal, the horizontal brightness signal, vertical color signal non-correlative energy, and the vertical brightness signal, respectively, from the aforementioned three types of delayed composite color television signals.

Next, first through fourth comparative signals, representative of horizontal or vertical correlative weaknesses, are generated on the basis of the energies.

Accordingly, horizontal and vertical correlative weaknesses of the composite color television signal can be judged from the comparative signal.

There are four types of non-correlative energies depending on the subject signal being horizontal signal or vertical signal, and color signal or brightness signal. So there may be provided a non-correlative energy extracting means comprising four types of non-correlative energy extracting circuits: a horizontal color signal non-correlative energy extracting circuit; a horizontal brightness signal non-correlative energy extracting circuit; a vertical color signal non-correlative energy extracting circuit; and a vertical brightness signal non-correlative energy extracting circuit. Each of such circuits is preferably composed of FIR (finite impulse response) filter, or of course, IIR (infinite impulse response filter).

A FIR filter can be composed of each of a predetermined number of delay means, subtracting means, absolute value calculating means, filters, and maximum value calculating means. The comparative judging means, for comparatively judging the comparative signals, may be composed of a comparing circuit and a judging circuit. As a comparing circuit, a typical two signal-comparing-type circuit may be used. In this case, first and second comparing circuits are required, since four types of comparative signals appear. The judging circuit determines the subject to be controlled in the switching circuit, and performs the controlling operation. The judging circuit, when the output of the comparing circuit is a binary signal, can be a logical element of NOT, AND, etc.

A comparative signal can be generated by the combination of a multiplier, an adder, and a maximum value circuit.

The horizontal color signal non-correlative energy extracting circuit and/or the vertical color signal non-correlative energy extracting circuit can be twice.

The above and other advantages, features and additional objects of this invention will be manifest to those versed in the art upon making reference to the following detailed description and the accompanying drawings in which a structural embodiment incorporating the principles of this invention is shown by way of illustrative example.

DETAILED DESCRIPTION

Figure 1:
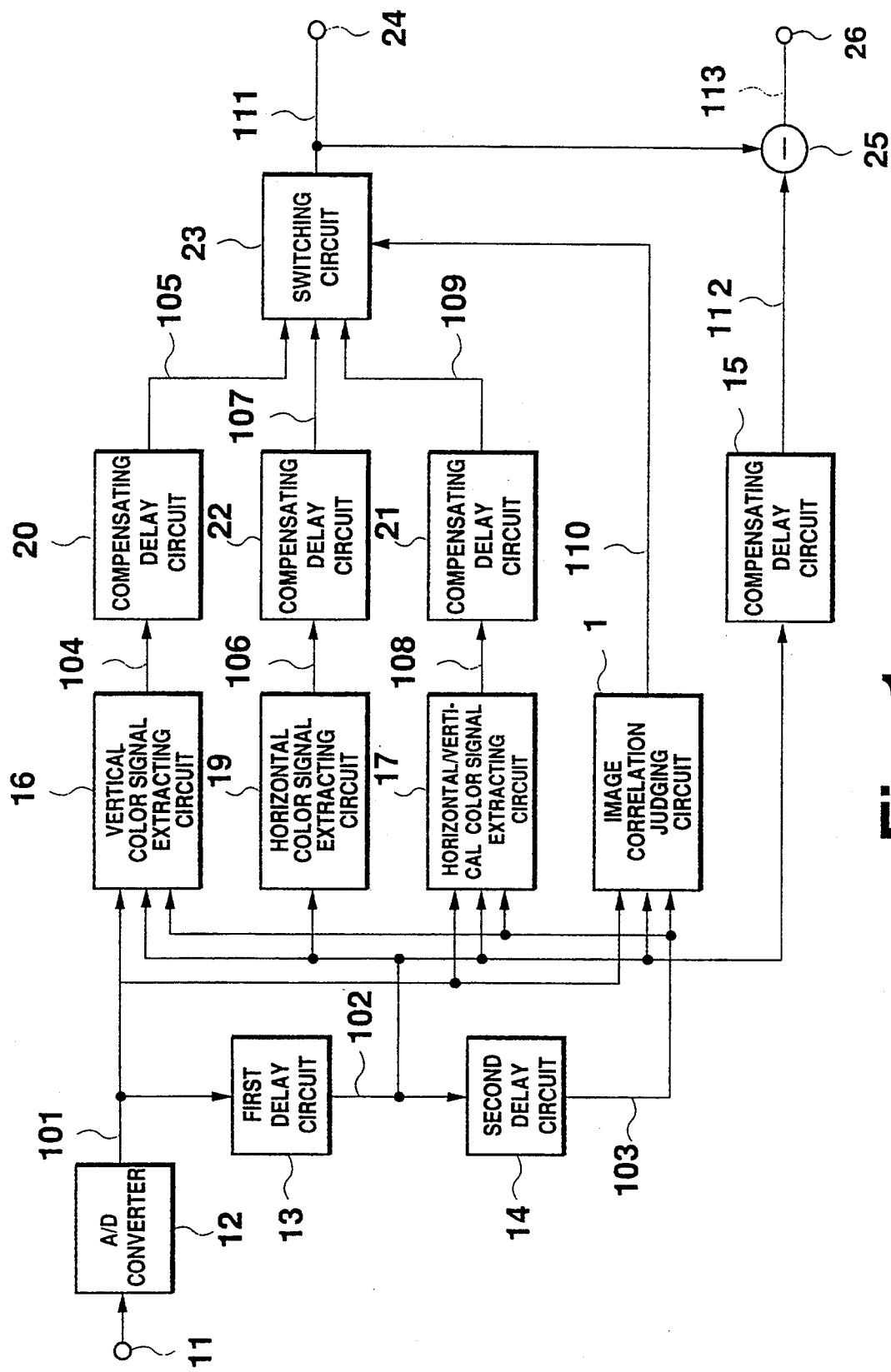
FIG. 1 is a block diagram showing a brightness signal/color signal separating filter according to the first embodiment of this invention.

The principles of this invention are particularly useful when embodied in a brightness signal/color signal separating filter such as shown in FIG. 1.

In FIG. 1, of an NTSC type circuit, an NTSC type composite color television signal is supplied to the input terminal 11. An A/D converter 12 converts the composite color television signal supplied through the input terminal 11 into digital signal. A first delay circuit 13 delays the output signal 101 of the A/D converter 12 by one line, and a second delay circuit 14 further delays that signal by another one line. The compensating delay circuit 15 compensationally delays the output signal 102 of the first delay circuit 13. The output signals 101, 102, and 103 of the A/D converter 12, the first delay circuit 13, and the second delay circuit 14, are fed to a vertical color signal extracting filter 16, a horizontal/vertical color signal extracting filter 17, and the image correlation judging circuit 18, respectively. The output signal 102 of the first delay circuit 13 is additionally supplied to a horizontal color signal extracting filter 19. The output signal 104 of the vertical color signal extracting filter 16 is supplied to the compensating delay circuit 20, and likewise: the output signal 108 of the horizontal/vertical color signal extracting filter 17, to the compensating delay circuit 21; the output signal 106 of the horizontal color signal extracting filter 19, to the compensating delay circuit 22, respectively. The switching circuit selects any one of the output signals 105, 107, and 109 of the compensating delay circuit 20, 22, and 21, based on the supplied output signal 110 of the image correlation judging circuit 1. The signal outputted from the output terminal 24 of the switching circuit 23 is a color signal. Meanwhile, the difference between the output signal 112 of the compensating delay circuit 15 and the output signal 111 of the switching circuit 23, obtained by the subtracting circuit 25, is outputted from the output terminal 26 as a brightness signal 113.

Figure 2:
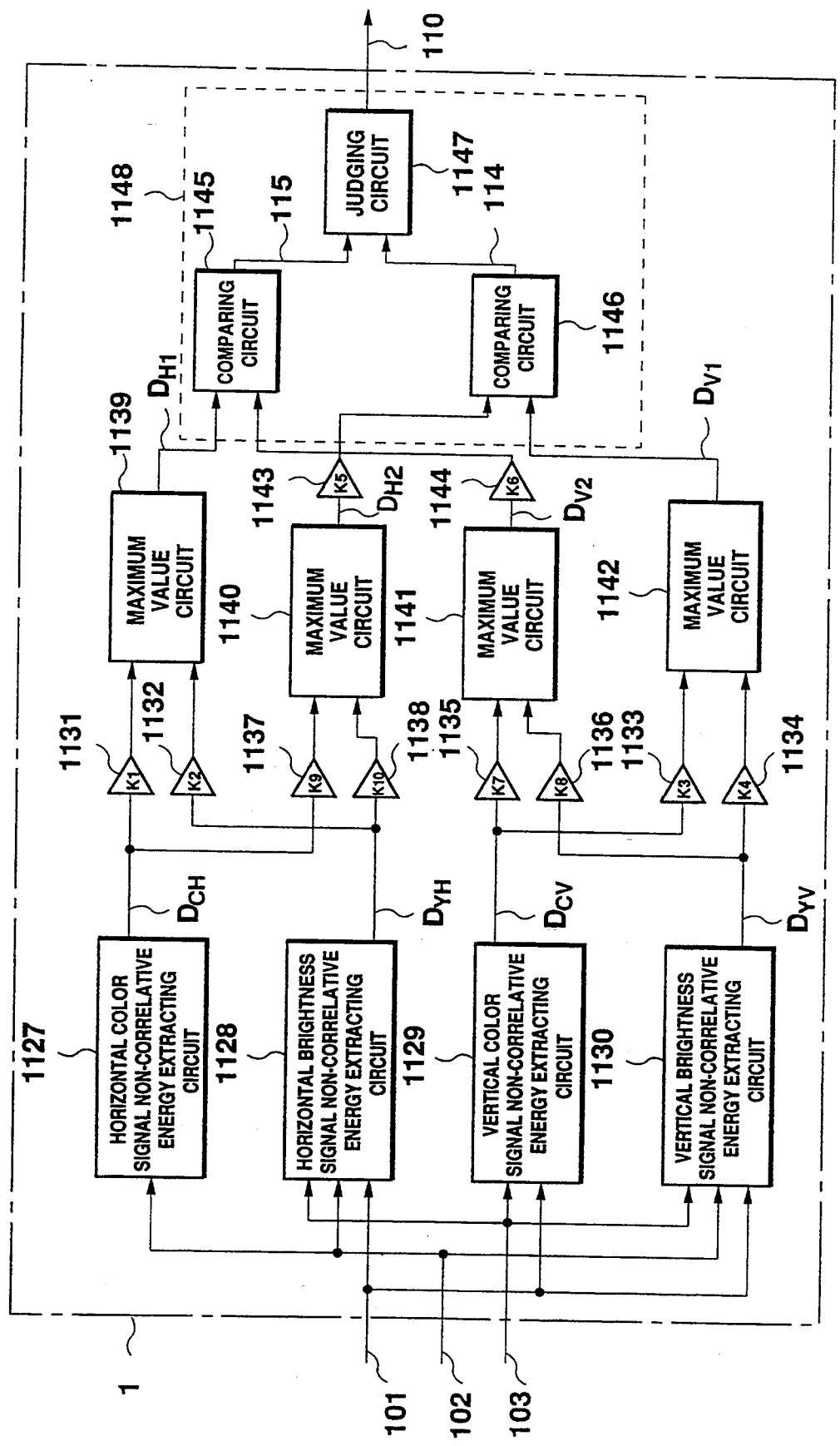
FIG. 2 is a detail block diagram of the image correlation judging circuit in FIG. 1.

In FIG. 2, the numbers designate respectively: 1127, a horizontal color signal non-correlative energy extracting circuit; 1128, horizontal brightness signal non-correlative energy extracting circuit; 1129, vertical color signal non-correlative energy extracting circuit; 1130, vertical brightness signal non-correlative energy extracting circuit; 1139, 1140, 1141, 1142, maximum value circuits; 1131–1138, 1143, 1144, multiplier circuits; 1145, 1146 comparative circuits; 1147, judging circuit; 1148, color signal extraction controlling circuit.

The output signal 101 of the A/D signal 12 is supplied to the horizontal brightness signal non-correlative energy extracting circuit 1128, the vertical color signal non-correlative energy extracting circuit 1129 and the vertical brightness signal non-correlative energy extracting circuit 1130.

The output signal 102 of the first delay circuit 13 is supplied to the horizontal color signal non-correlative energy extracting circuit 1127, the horizontal brightness signal non-correlative energy extracting circuit 1128, and the vertical brightness signal non-correlative energy extracting circuit 1130.

The output signal 103 of the second delay circuit 14 is supplied to the horizontal brightness signal non-correlative energy extracting circuit 1128, vertical color signal non-correlative energy extracting circuit 1129, and the vertical brightness signal non-correlative energy extracting circuit 1130.

The output signal DCH of the horizontal color signal non-correlative energy extracting circuit 1127 is supplied to the multiplier 1131, 37. The multiplying circuit 1137 multiplies the signal DCH by a constant K9 and supplies the multiplied result to the maximum value circuit 1140, while the multiplying circuit 1131 multiplies the signal DCH by a constant K1 and supplies the multiplied result to the maximum value circuit 1139. The output signal DYH of the horizontal brightness signal non-correlative energy extracting circuit 1128 is supplied to the multiplying circuit 1132, 1138. The multiplying circuit 1138 multiplies the signal DYH by a constant K10 and supplies the multiplied result to the maximum value circuit 1140, while the multiplying circuit 1132 multiplies the signal DYH by a constant K2 and supplies the multiplied result to the maximum value circuit 1139. The output signal of the maximum value circuit 1139 is then supplied to the comparing circuit 1145 as first horizontal non-correlative energy DH1. The output signal of the maximum value circuit 1140 is, after multiplied by a constant K5 in the multiplying circuit 1143, supplied to the comparing circuit 1145 as second horizontal non-correlative energy DH2.

The output signal DCV of the vertical color signal non-correlative energy extracting circuit 1129 is supplied to the multiplying circuit 1135, 1133. The multiplying circuit 1135 multiplies the signal DCV by a constant K7 and supplies the multiplied result to the maximum value circuit 1141, while the multiplying circuit 1133 multiplies the signal DCV by a constant K3 and supplies the multiplied result to the maximum value circuit 1142. The output signal DYV of the vertical brightness signal non-correlative energy extracting circuit 1130 is supplied to the multiplying circuit 1136, 34. The multiplying circuit 1136 multiplies the signal DYV by a constant K8 and supplies the multiplied result to the maximum value circuit 1141, while the multiplying circuit 1134 multiplies the signal DYV by a constant K4 and supplies the multiplied result to the maximum value circuit 1142. The output signal of the maximum value circuit 1142 is supplied to the comparing circuit 1146 as first non-correlative energy DV1. The output signal of the maximum value circuit 1141 is, after multiplied by a constant K6, to the comparing circuit 1145 of the color signal extraction controlling circuit 1148 as second vertical non-correlative energy DV2.

The comparing circuit 1145 compares the first horizontal non-correlative energy DH1 with the product K6 * DV2 of the second vertical non-correlative energy DV2 multiplied by a constant K6, and makes the output signal 115 HIGH level in case of DH1≧K6*DV2 and LOW level in other cases.

The comparing circuit 1146 compares the first vertical non-correlative energy DV1 with the product K5*DHd2 of the second horizontal non-correlative energy DH2 multiplied by a constant K5, and makes the output signal 114 HIGH level in case of DV1≧K5*DH2 and LOW level in other cases.

The output signals 115 and 114 of the comparing circuit 1145 and 1146 respectively are supplied to the judging circuit 1147 of the color signal extraction controlling circuit 1148. The output signal 110 of the judging circuit 1147 is sent out as an output of the image correlation judging circuit.

Figure 3:
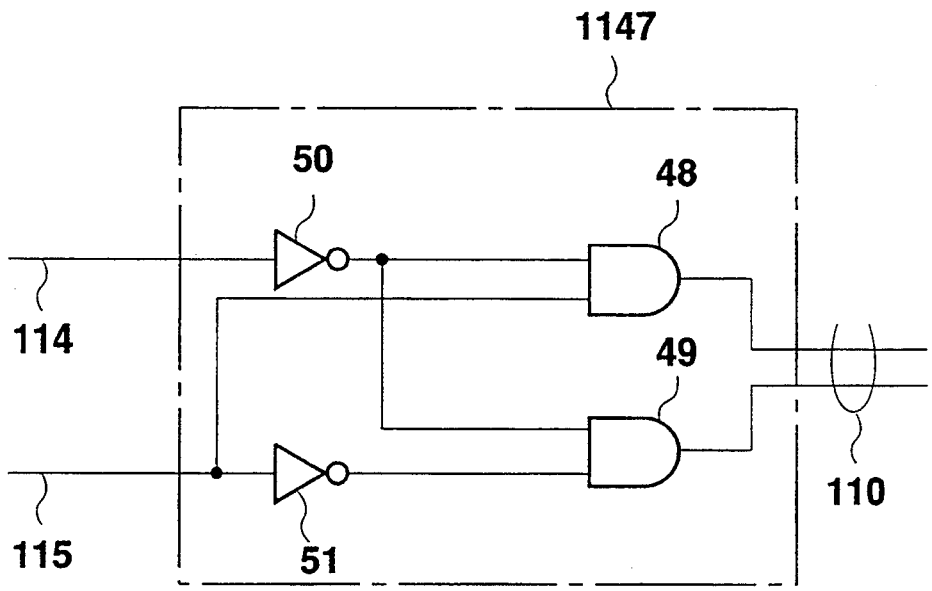
FIG. 3 is a detail block diagram of the judging circuit in FIG. 2.

FIG. 3 is a circuit diagram showing an exemplified judging circuit 1147 in FIG. 2. This judging circuit 1147 is composed of an AND circuit 48, 49, a NOT circuit 50, 51. The output signal 115 of the comparing circuit 1145 is inputted to an input terminal of the AND circuit 49 through the NOT circuit. The output signal 114 of the comparing circuit 1146 is inputted to the AND circuit 48, 49 through the NOT circuit. The output signals of the AND circuit 48, 49 becomes an output signal 110 of the image correlation judging circuit.

Figure 4:
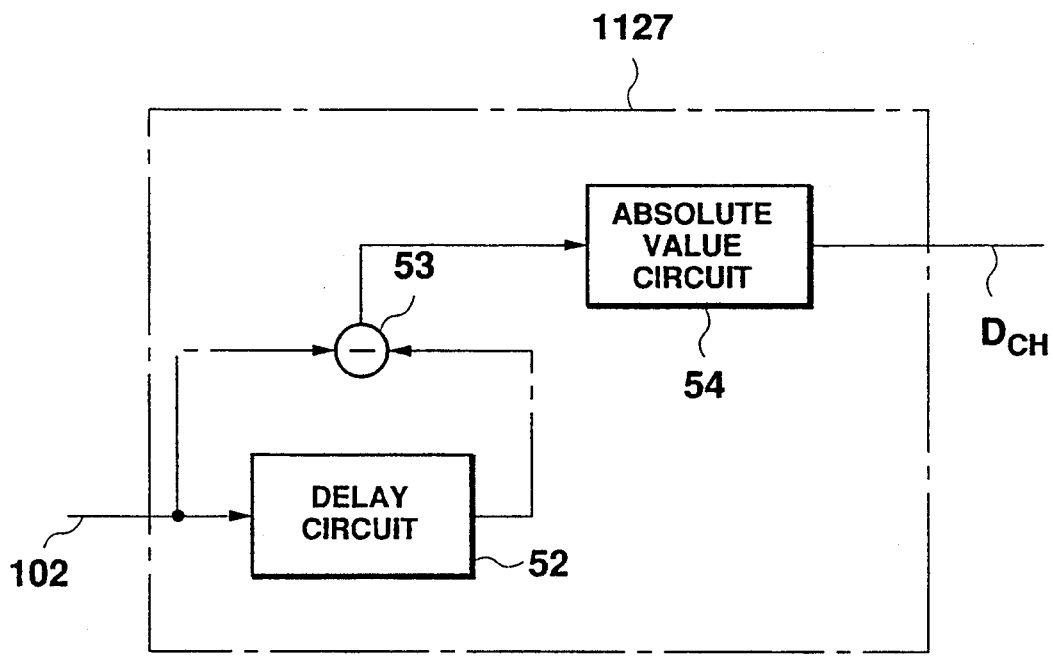
FIG. 4 is a detail block diagram of the horizontal color signal non-correlative energy extracting circuit in FIG. 1.

FIG. 4 is a block diagram, showing an exemplified horizontal color signal non-correlative energy extracting circuit 1127 in FIG. 2., including a delay circuit 52, a subtracting circuit 53 and an absolute value circuit 54.

The output signal 102 of the first delay circuit 13 is fed to an input terminal of the delay circuit 52 having a delaying amount equivalent to one cycle of color sub-carrier [=(1/fsc)].

The output signal 102 of the first delay circuit 13 and the output signal of the delay circuit 52 are supplied to the subtracting circuit 53. The output signal of the subtracting circuit 53 i.e. the difference between the both supplied signals are fed to the absolute value circuit 54, the output DCH of which becomes an output of the horizontal color signal non-correlative energy extracting circuit 1127.

Figure 5:
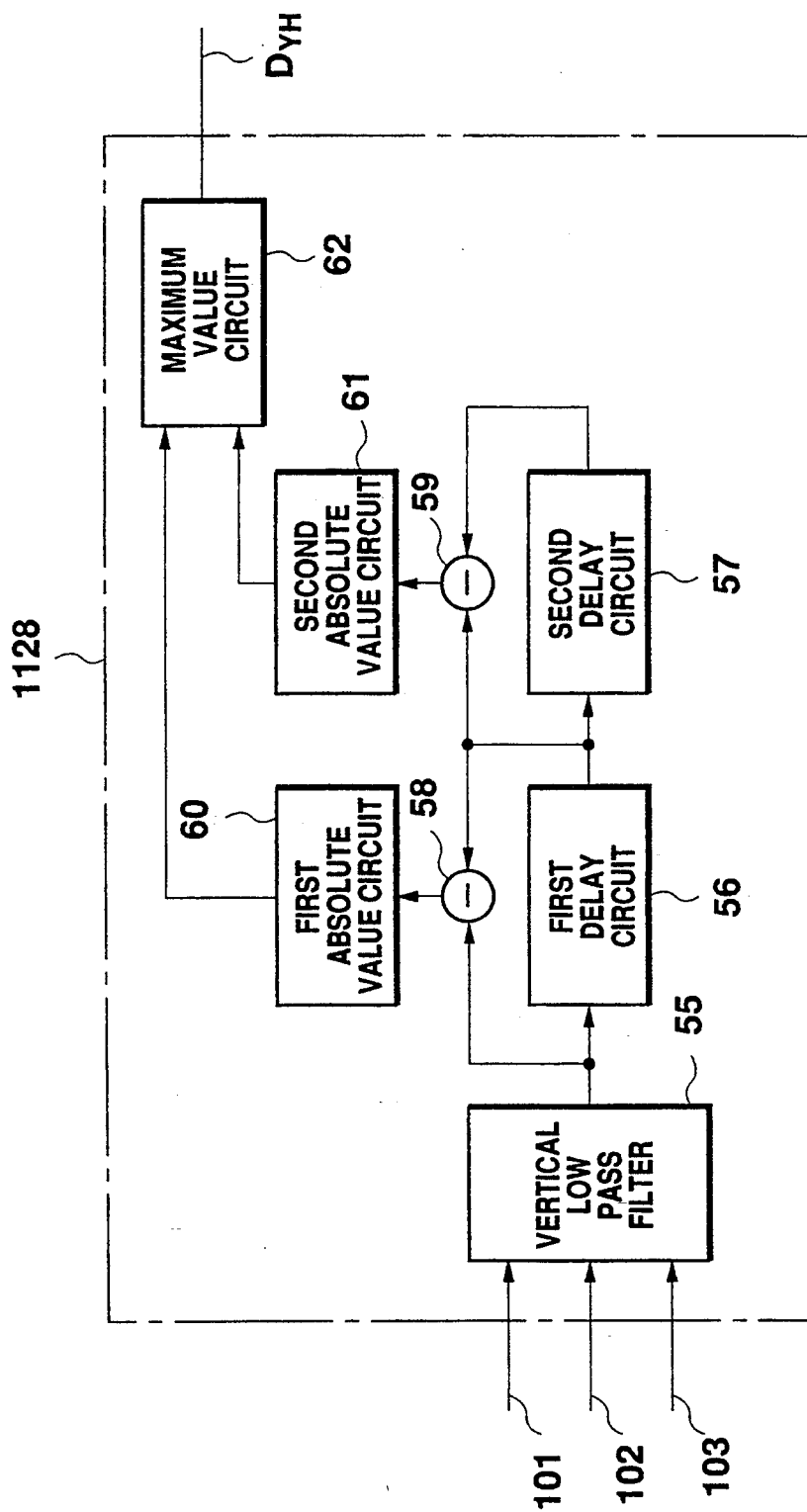
FIG. 5 is a detail block diagram of the horizontal brightness signal non-correlative energy extracting circuit in FIG. 1.

FIG. 5 is a block diagram showing an exemplified horizontal brightness signal non-correlative energy extracting circuit 1128 in FIG. 2 including a vertical low pass filter 55, a first delay circuit 56, a second delay circuit 57, a first subtracting circuit 58, a second subtracting circuit 59, a first absolute value circuit 60, a second absolute value circuit 61, and a maximum value circuit 62.

The output signals 101, 102, and 103 of the A/D converter 12, the first delay circuit 13 and the second delay circuit 14 respectively, are inputted to the vertical low pass filter.

The output signal of the vertical low pass filter in FIG. 5 is supplied to the first delay circuit 56 having a delaying amount corresponding to a half of the cycle of color subcarrier, and thereafter, further supplied to the first subtracting circuit 58 along with the output of the first delay circuit 56. On the other side, the output of the first delay circuit 56 is fed to the input terminals of the second delay circuit 57 and the second subtracting circuit 59. The output of the delay circuit 57 is also supplied to the second subtracting circuit 59. The outputs of the first subtracting circuit 58 are sequentially inputted to the maximum value circuit through the first absolute value circuit 60, while the output of the second subtracting circuit 59 is inputted to the maximum value circuit 62 through the second absolute value circuit 61. The output DYH of the maximum value circuit 62 becomes an output of the horizontal brightness signal non-correlative energy extracting circuit 1128.

Figure 6:
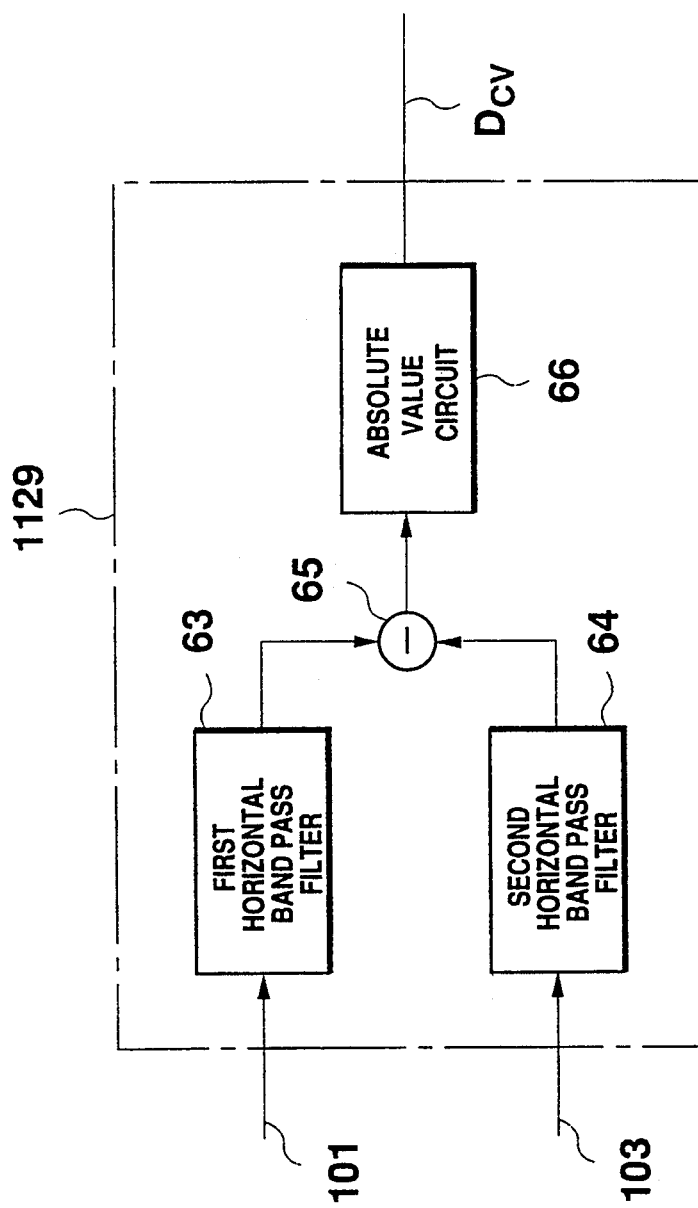
FIG. 6 is a detail block diagram of the vertical color signal non-correlative energy extracting circuit in FIG. 1.

FIG. 6 is a block diagram showing an exemplified vertical color signal non-correlative energy extracting circuit 1129 in FIG. 2 including a first and a second horizontal band pass filters 63, 64, a subtracting circuit 65, and a absolute value circuit 66.

The output signal 101 of the A/D converter 12 is supplied to the first horizontal band pass filter 63, and the output signal 103 of the second delay circuit 14 is supplied to the second horizontal band pass filter 64. The outputs of the first and second horizontal band pass filters 63, 64 are supplied to the subtracting circuit 65, the output of which is then inputted to the absolute value circuit 66. The output DCV of the maximum value circuit 66 becomes an output of the vertical color signal non-correlative energy extracting circuit 1129.

Figure 7:
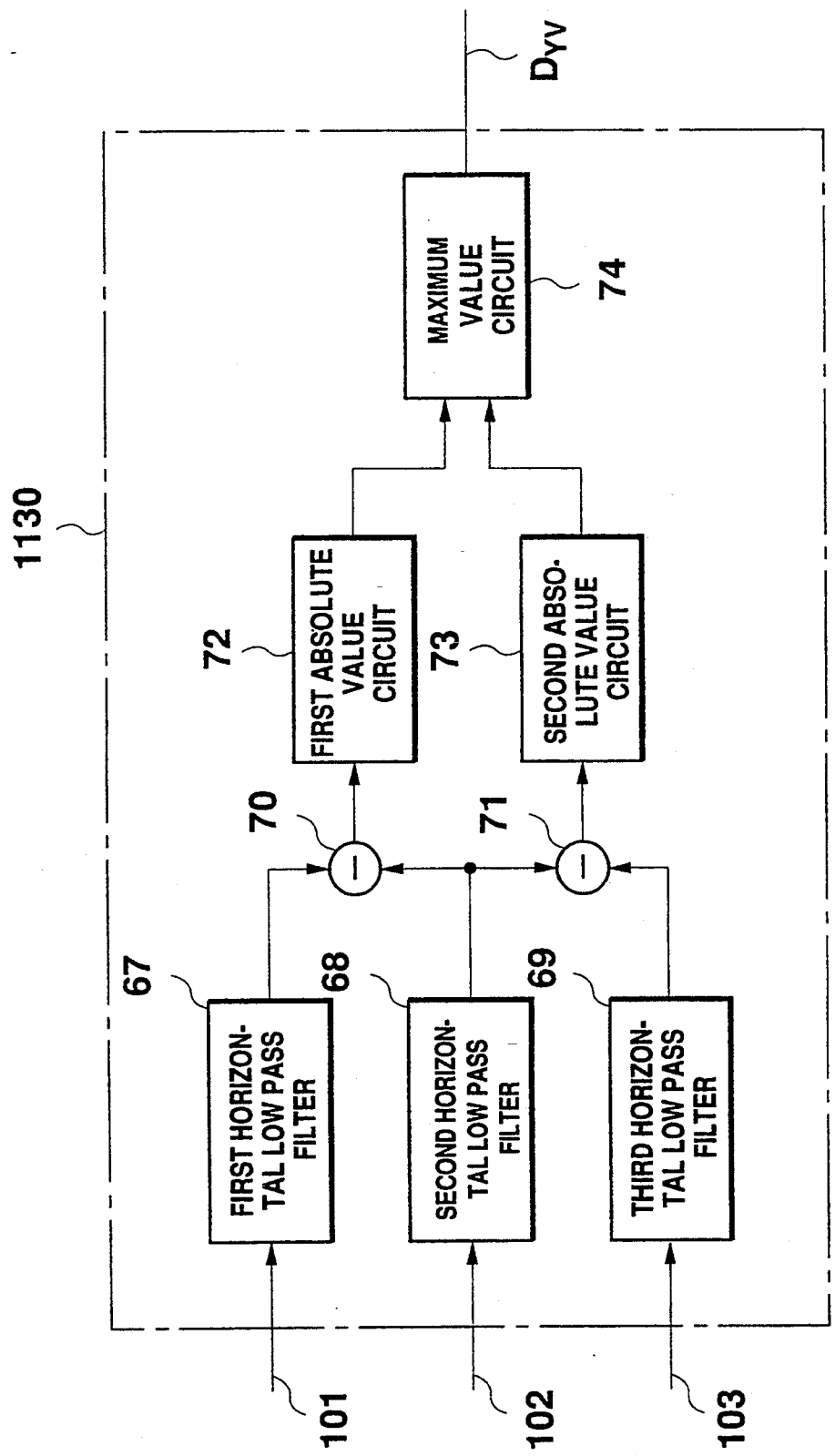
FIG. 7 is a detail block diagram of the vertical brightness signal non-correlative energy extracting circuit in FIG. 1.

FIG. 7 is a circuit diagram showing an exemplified vertical brightness signal non-correlative energy extracting circuit in FIG. 2 including a first through a third horizontal low pass filters 67–69, a first and a second subtracting circuits 70, 71, a first and a second absolute value circuits 72, 73 and a maximum value circuit 74.

The output signal 101 of the A/D converter 12 is inputted to the horizontal low pass filter 67, and likewise: the output signal 102 of the first delay circuit 13, to the horizontal low pass filter 68; the output signal 103 of the second delay circuit 14, to the horizontal low pass filter 69; the output of the first horizontal low pass filter 67, to the first subtracting circuit 70; the output of the second horizontal low pass filter 68, to the first and the second subtracting circuits 70, 71; the output of the third horizontal low pass filter 69, to the second subtracting circuit 71.

The outputs of the first and the second subtracting circuits 70 and 71 are supplied to the first and the second absolute value circuits 72 and 73 respectively, and the outputs of the first and the second absolute value circuits 72, 73 are supplied to the maximum value circuit 74. The output DYV of this absolute value circuit 74 becomes the output of the vertical brightness signal non-correlative energy extracting circuit 1130.

In operation, when a NTSC type composite color television signal is input via the input terminal 11, the A/D converter 12 samples this signal with the sampling frequency fs=4 fsc.

The output signal 101 of the A/D converter 12 represents a sampling value at a target sampling point, and renders a sampling value at a position upper by one line on screen when inputted to the first delay circuit 13 and a sampling value at a position lower by one line on the screen when inputted to the second delay circuit 14.

Figure 17:
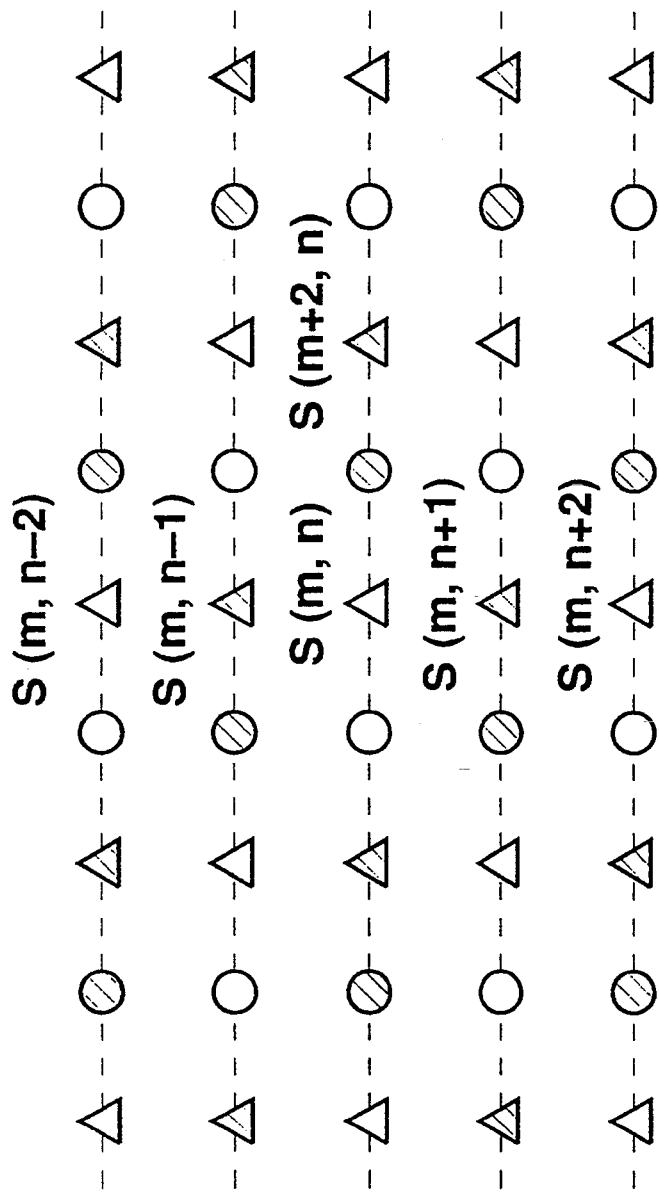
FIG. 17 illustrates an arrangement of signal successions on the screen.

Namely, signals S (m, n−1) and S (m, n+1) appear at the outputs of the second delay circuit 14 and the A/D converter 12 respectively when a composite color television signal (sampling value) S (m, n) is outputted from the first delay circuit 13 (see FIG. 17). The brightness signal/color signal separating filter is designed on the basis of these sampling values at the sampling points over three lines on the screen.

The both sampling values outputted from the first and the second delay circuits 13 and 14 are supplied to the vertical color signal extracting filter 16, the horizontal/vertical color signal extracting filter 17, the image correlation judging circuit 1. The sampling value from the first delay circuit 13 is additionally supplied to the horizontal color signal extracting filter 19.

In this case, the transmitting functions of the vertical color signal extracting filter 16, the horizontal color signal extracting filter 19, and the horizontal/vertical color signal extracting filter 17 are can be expressed respectively e.g.:

$$C_v(Z) = (-\tfrac{1}{4})(1-Z^{-1})^2$$

$$C_h(Z) = (-\tfrac{1}{4})(1-Z^{-2})^2$$

$$C_{hv}(Z) = (-\tfrac{1}{4})(1-Z^{-2})^2 * (-\tfrac{1}{4})(1-Z^{-1})^2$$

The output signals 104, 106 and 108 of these filters 16, 19 and 17 are compensating-delayed respectively in the compensating delay circuit 20, 22 and 21, and thereafter inputted to the switching circuit 23 as signals 105, 107 and 109.

The switching circuit 23 selects any one of the color output signals from the vertical color signal extracting filter 16, horizontal color signal extracting filter 19, and the horizontal/vertical color signal extracting filter 17.

This selection is carried out on the following basis. Firstly, the image correlation judging circuit 1 detects the vertical and horizontal image correlations on the target sampling point. Based on the detected result, the switching circuit 23 is switched upon receiving the signal 110 to select: the output signal 105 of the compensating delay circuit 20 when the vertical correlation is particularly strong; the output signal 107 of the compensating circuit 22 when the horizontal correlation is particularly strong; and the output signal 109 of the compensating delay circuit 21 in other cases.

The image correlation judging circuit 1 controls the switching circuit 23 in the manner as described hereinafter.

A transmission function DCH (Z) of the horizontal color signal non-correlative energy extracting circuit 1127, likewise DYH (Z) of the horizontal brightness signal non-correlative energy extracting circuit 1128, DCV (Z) of the vertical color signal non-correlative energy extracting circuit 1129, and DYV (Z) of the vertical brightness signal non-correlative energy extracting circuit 1130 can be expressed, from the composition of the circuit 1127–1130, as:

$$DCH(Z) = |1 - Z^{-4}|$$

$$DYH(Z) = \max\left(|(\tfrac{1}{4})*(1+Z^{-1})^2*(1-Z^{-2})|, |(\tfrac{1}{4})*(1+Z^{-1})^2(Z^{-2}-Z^{-4})|\right)$$

$$DCV(Z) = |(1-Z^{-2})^2 * (1-Z^{-2l})|$$

$$DYV(Z) = \max\left(|(\tfrac{1}{4})*(1+Z^{-2})^2*(1-Z^{-l})|,\right.$$

$$\left.|(\tfrac{1}{4})*(1+Z^{-2})^2*(Z^{-l}-Z^{-2l})|\right)$$

The output DCH, DYH, DCV, and DYV of the circuits 1127–1130 having these transmission functions are as mentioned above supplied to the maximum value circuits 1139–1142 through the multipliers 1131–1138. As a result, generated first horizontal non-correlative energy DH1, second horizontal non-correlative energy DH2, first vertical non-correlative energy DV1, and second vertical non-correlative energy DV2 are expressed as follows:

$$DH1 = \max(K1*DCH, K2*DYH)$$

$$DH2 = \max(K9*KCH, K10*DYH)$$

$$DV1 = \max(K3*DCV, K4*DYV)$$

$$DV2 = \max(K7*DCV, K8*DYV)$$

At this time, the comparing circuit 1146 of the image correlation judging circuit 1, if $DV1 \geq K5*DH2$, outputs signal "1" to the judging circuit 1147 regarding that there is horizontal correlation without any vertical correlation; and if $DV1 < K5*DH2$, outputs signal "0" to the judging circuit 1147 regarding that there is no horizontal correlation.

On the other hand, the comparing circuit 1145 of the image correlation judging circuit 1, if $DH1 \geq K6*DV2$, outputs a signal "1" to the judging circuit 1147 regarding that there is vertical correlation without any horizontal correlation; and if $DHd1 < K6 * DV2$, outputs a signal "0" to the judging circuit 1147 regarding that there is no vertical correlation.

The judging circuit 1147 controls the switching circuit 23 according to the detected result of above correlation, namely, the relationship between the input and the output of the judging circuit 1147 becomes as the TABLE 1.

TABLE 1

| 114 of the comparing circuit 1146 | 115 of the comparing circuit 1145 | output signals of: 110 of the judging circuit 1147 | | 111 selected by the switching circuit 23 | |
|---|---|---|---|---|---|
| | | 110a of the AND circuit 48 | 110b of the AND circuit 49 | | |
| 0 | 0 | 0 | 1 | 109 | for H/V extraction |
| 0 | 1 | 1 | 0 | 105 | for V extraction |
| 1 | 0 | 0 | 0 | 107 | for H extraction |
| 1 | 1 | 0 | 0 | 107 | for H extraction |

(H: horizontal)
(V: vertical)

The switching circuit 23 is switched in response to these outputs of the AND circuits 48 and 49: the output signal 107 of the compensating delay circuit 22 is passed when the both output signals of the AND circuits 48 and 49 are "0"; the output signal 105 of the compensating delay circuit 20 is passed when the output signal of the AND circuit 48 is "1" and the output signal of the AND circuit 49 is "0"; the output signal 109 of the compensating delay circuit 21 is passed when the output signal of the AND circuit 48 is "0" and the output signal of the AND circuit 49 is "1".

Thus, in the embodiment shown in FIG. 1, the color signal extracting filter characteristic C(Z) becomes switched, according to whether the correlation exists or not, as follows:

$$C(Z) = Ch(Z),$$

when there is horizontal correlation;

$$C(Z) = Cv(Z),$$

when there is no horizontal correlation, and no vertical correlation; and $$C(Z) = Chv(Z),$$

when there is neither horizontal correlation nor vertical correlation.

In this manner, according to this embodiment, the vertical and horizontal image correlations of a composite color television signal are detected by the image correlation judging circuit 1 and that the switching circuit 23 is switched in response to the detected result. Consequently, mutual leakage of the brightness signal and the color signal into another's channel can be reduced, thereby avoiding dot jamming.

Figure 8:
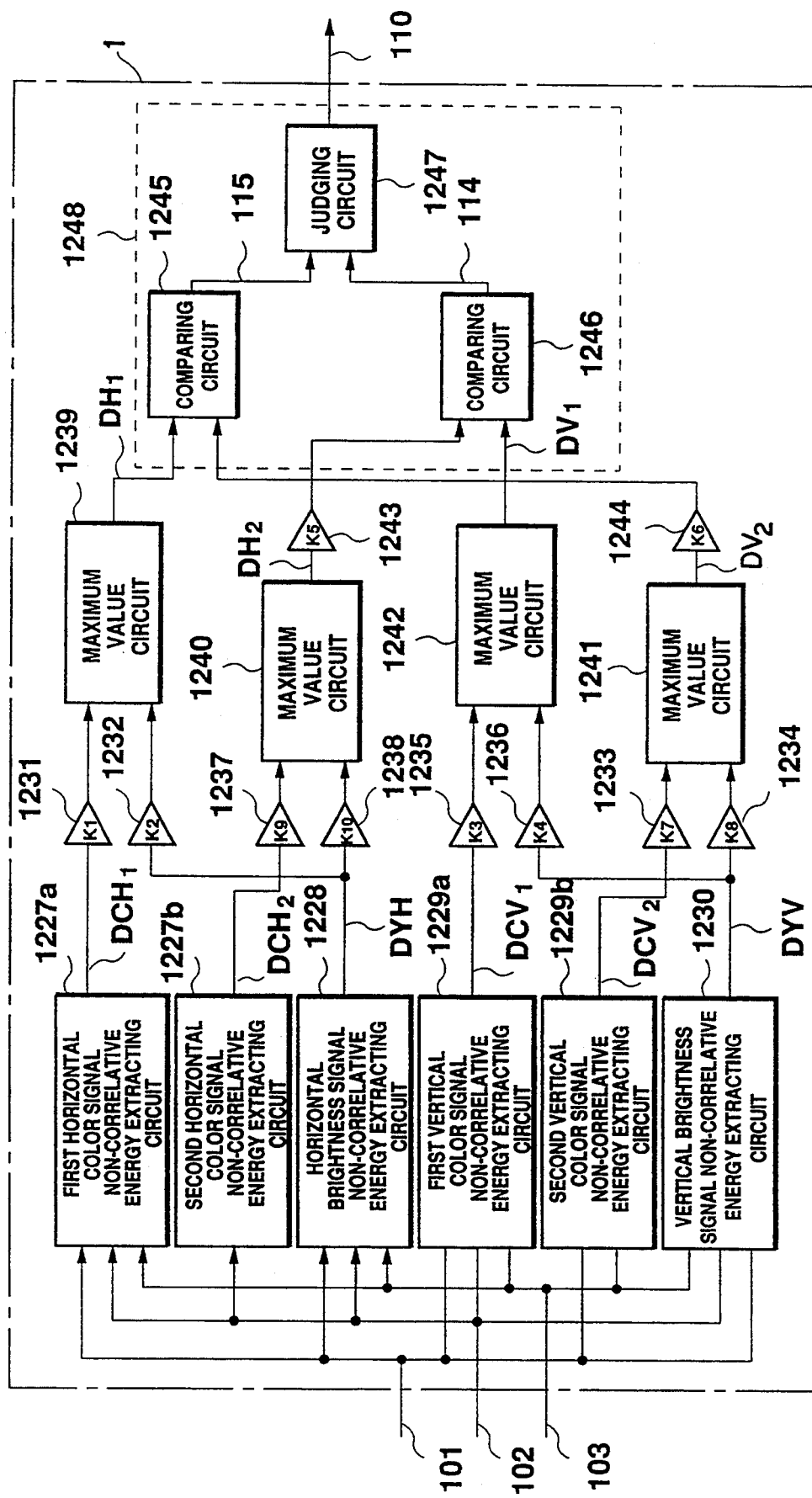
FIG. 8 is a block diagram of an image correlation judging circuit according to the second embodiment.

FIG. 8 shows an image correlation judging circuit of the brightness signal/color signal separating filter according to the second embodiment of this invention.

In this embodiment, the horizontal non-correlative energy extracting circuit 1227 is divided into sub-circuits 1227a and 1227b having mutually different property. Further, the vertical color signal non-correlative energy extracting circuit 1229 is divided into sub-circuits 1229a and 1229b in the same manner. The horizontal color signal non-correlative energy extracting circuit 1227a supplies the DCH1 to the multiplier 1231, while the horizontal color signal non-correlative energy extracting circuit 1227b supplies the DCH2 to the multiplier 1237, respectively. Likewise, the vertical color signal non-correlative energy extracting circuit 1229a supplies the DCV1 to the multiplier 1235, while the vertical color signal non-correlative energy extracting circuit 1229b supplies DCV2 to the multiplier 1233, respectively.

Also in such composition, the similar effect to the first embodiment can be rendered.

Alternatively, it is also possible to divide each of the horizontal brightness signal non-correlative energy extracting circuit 1228, the vertical brightness signal non-correlative energy extracting circuit 1230 into two sub-circuits of mutually different properties.

Figure 9:
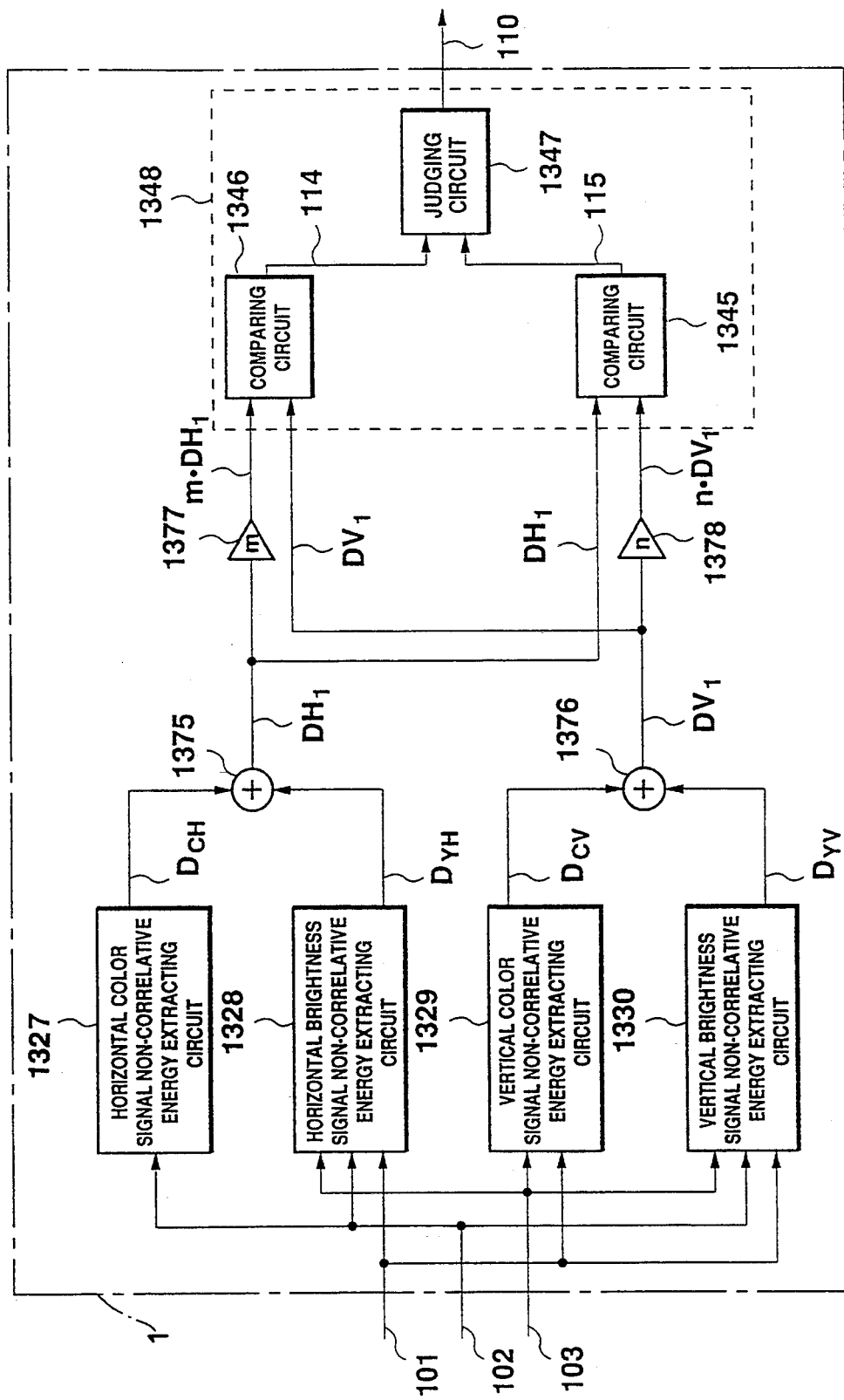
FIG. 9 is a block diagram of an image correlation judging circuit according to the third embodiment.

FIG. 9 shows an image correlation judging circuit 1 of the brightness signal/color signal separating filter according to the third embodiment of this invention.

This embodiment incorporates an adder 1375 for adding the output DCH of the horizontal color signal non-correlative energy extracting circuit 1327 to the output DYH of the horizontal brightness signal non-correlative energy extracting circuit 1328, and likewise, an adder 1376 for adding the output DCV of the vertical color signal non-correlative energy extracting circuit 1329 to the output DYV of the vertical brightness signal extracting circuit 1330.

The adder 1375 is connected to the comparing circuit 1346 of the color signal extraction controlling circuit 1348 via the multiplier 1377. The multiplier 1377 multiplies the output DH1 of an integer m, and supplies the multiplied result m*DH1 to the comparing circuit 1346. The output DH1 of the adder 1375 is additionally supplied to the comparing circuit 1345 of the color signal extraction controlling circuit 1348.

Similarly, the adder 1376 is connected to the comparing circuit 1345 through the multiplier 1378. The adder 1378 multiplies the output DV1 of the multiplier 1376 by an integer n, and supplies the multiplied result n*DV1 to the comparing circuit 1345. The output DV1 of the multiplier 1376 is additionally supplied to the comparing circuit 1346 of the color signal extraction controlling circuit 1348.

The comparing circuit 1346 compares the magnitude of m*DH1 with DV1, and makes the output signal 114 high level in case of DV1≧m * DH1 and makes that low level in remaining cases.

Similarly, the comparing circuit 1345 compares n*DV1 with DH1, and makes the output signal 115 high level when DH1≧n*DV1 and makes that low level in remaining cases.

In this embodiment, the outputs of the adder 1375 and the 1376, i.e. horizontal non-correlative energy DH1 and vertical non-correlative energy DV1 respectively, can be expressed as:

$$DH1 = DCH + DYH$$

$$DV1 = DCV + DYV$$

The comparing circuit 1346 compares DV1 with m*DH1. In case of DV1≧m*DH1, this circuit 1346 judges that there is horizontal correlation and no vertical correlation and outputs high level signal 114 to the judging circuit 1347, and contrastingly in case of DV1<m*DH 1, judges that there is no horizontal correlation and outputs low level signal 114 to the judging circuit 1347.

Similarly, the comparing circuit 1345, in case of DH1≧n*DV1, judges that there is vertical correlation and no horizontal correlation and outputs high level signal 115 to the judging circuit 1347. Further, contrastingly in the case of DV1<n*DV1, it judges that there is no vertical correlation and outputs low level signal 115 to the judging circuit 1347.

The judging circuit 1347 judges and controls the switching circuit 23 according to the signals 114 and 115. In consequence, the color signal to be selected will be as shown in the TABLE 1.

Thus, this embodiment can also render the same effect as in the first embodiment.

Figure 10:
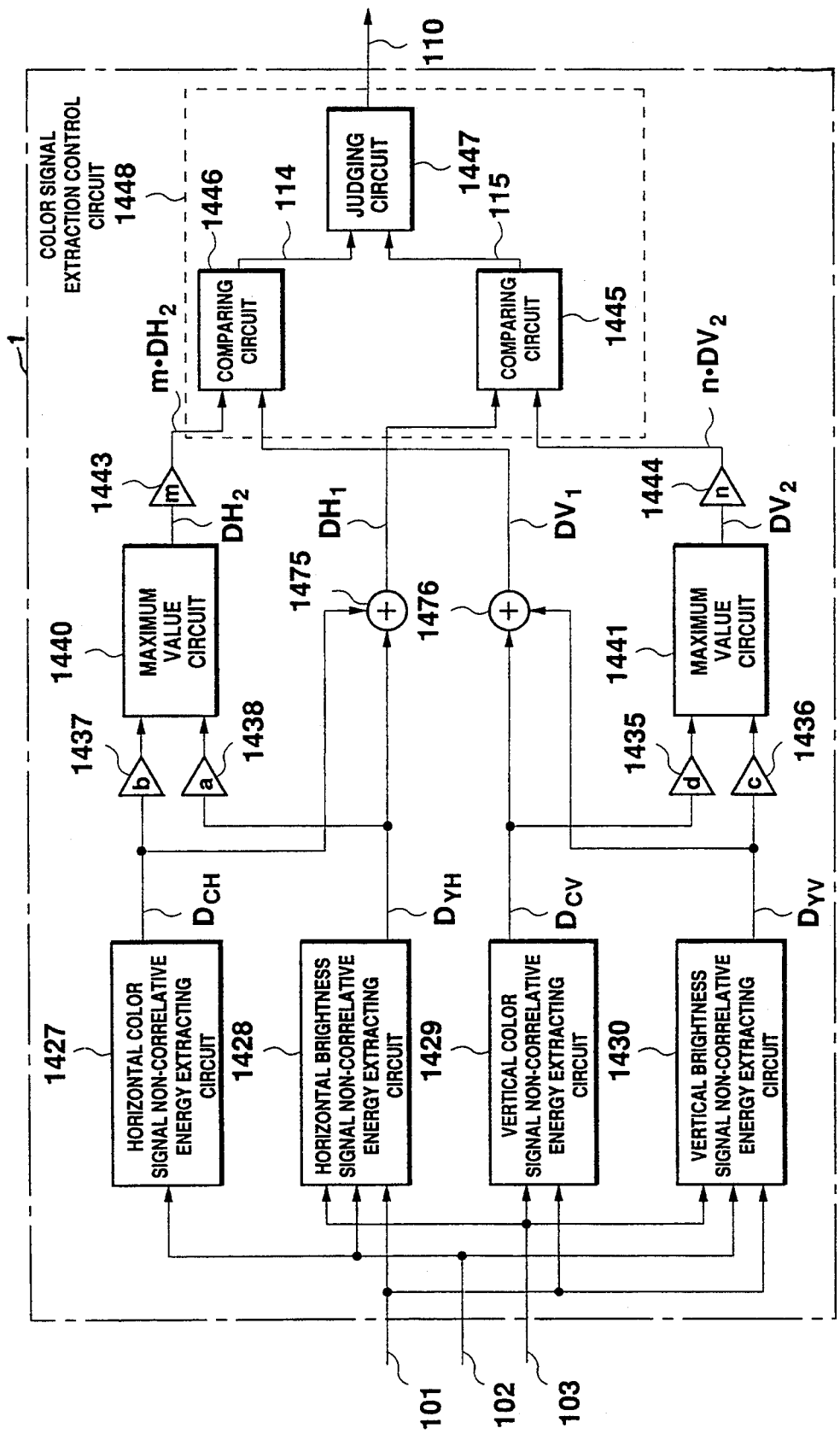
FIG. 10 is a block diagram of an image correlation judging circuit according to the fourth embodiment.

FIG. 10 shows a image correlation judging circuit 1 of the brightness signal/color signal separating filter according to the fourth embodiment of this invention.

In this embodiment, the output DCH of the horizontal color signal non-correlative energy extracting circuit 1427 is multiplied by an integer b in a multiplier 1437 and then supplied to a maximum value circuit 1440. Likewise, the output DYH of the horizontal brightness signal non-correlative energy extracting circuit 1428 is multiplied by an integer a in a multiplier 1438 and then supplied to the maximum value circuit 1440. The maximum value circuit 1440 compares b*DCH with a*DYH for the maximum value and outputs this as a second horizontal non-correlative energy DH2. This is in turn multiplied by and integer m in the multiplier 1443 and supplied thereafter to the comparing circuit 1446 of the color signal extraction controlling circuit 1448.

Similarly, the output DCV of the vertical color signal non-correlative energy extracting circuit 1429 is multiplied by an integer d in the multiplier 1435 and then supplied to a maximum value circuit 1441. Likewise, the output DYV of the vertical brightness signal non-correlative energy extracting circuit 1430 is multiplied by an integer c in a multiplier 1436 and then supplied to a maximum value circuit 1441. The maximum value circuit 1441 compares d*DCV with c*DYV DYV for the maximum value and outputs this as a second vertical non-correlative energy DV2, which is multiplied by an integer n in the multiplier 1444 and supplied thereafter to the comparing circuit 1445 of the color signal extraction controlling circuit 1448.

Besides the m*DH2, also the first vertical non-correlative energy DV1 is supplied to the comparing circuit 1446. This energy DV1 has been obtained by adding the output DCV of the vertical color signal non-correlative energy extracting circuit 1429 to the output DYV of the vertical brightness signal non-correlative energy extracting circuit 1430 in the adder 1476.

Similarly, besides the n*DV2, the first horizontal non-correlative energy DH1 is also supplied to the comparing circuit 1445. This energy DH1 has been obtained by adding the output DCH of the horizontal color signal non-correlative energy extracting circuit 1427 to the output DYH of the horizontal brightness signal non-correlative energy extracting circuit 1428 in the adder 1475.

The comparing circuits 1446 and 1445 performs a comparing operation similar to that in the third embodiment, and the judging circuit 1447 of the color signal extraction controlling circuit 1448 also functions likewise. Here, the relationship between the signals can be formulated as follows:

$$DH1 = DCH + DYH$$

$$DH2 = \max(b*DCH, a*DYH)$$

$$DH1 = DCV + DYV$$

$$DV2 = \max(d*DCV, c*DYV)$$

With these formulas, too, the switching circuit 23 carries out the same selecting operation as in the first embodiment.

Accordingly, this embodiment can also render similar effect to the first embodiment.

Figure 11:
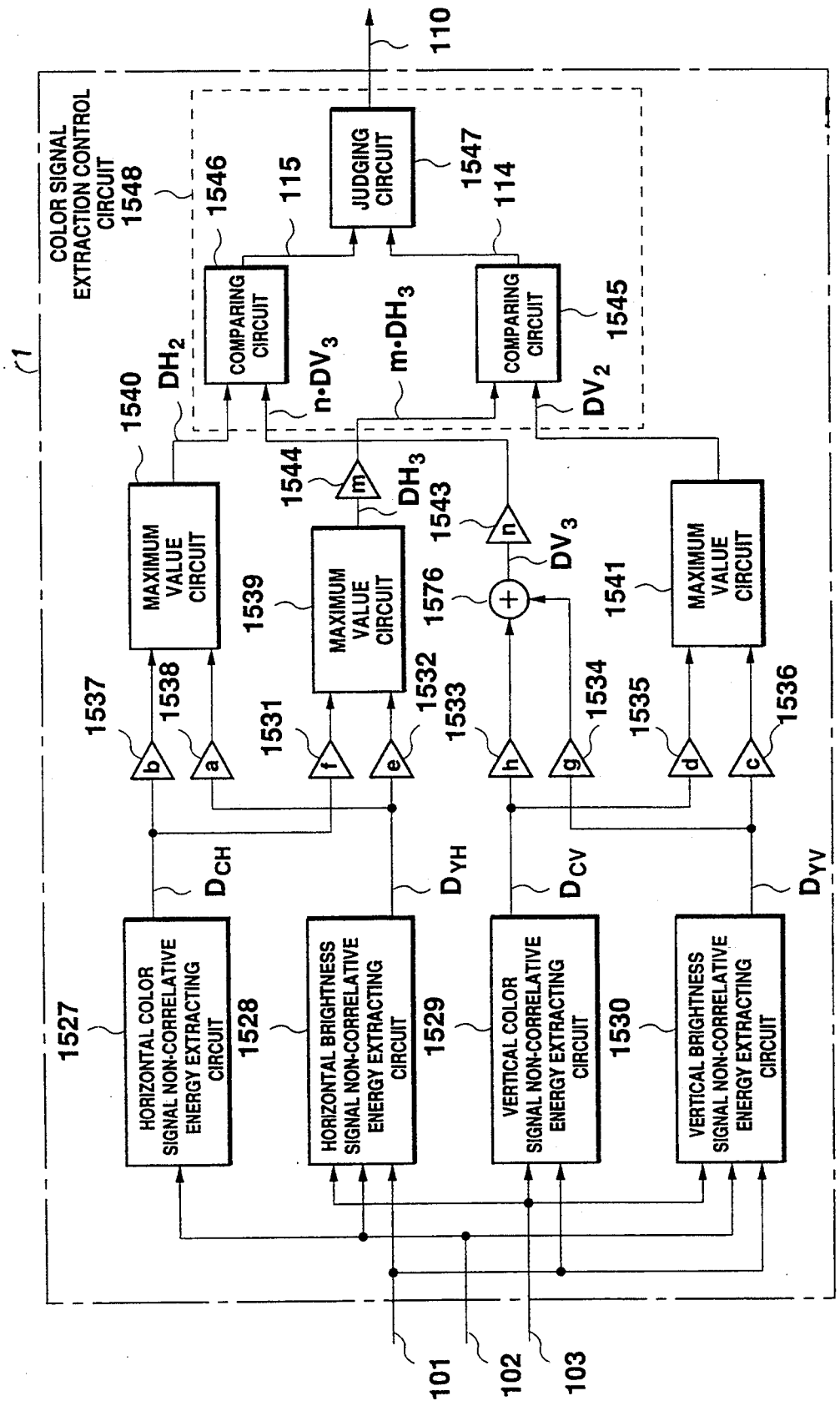
FIG. 11 is a block diagram of an image correlation judging circuit according to the fifth embodiment.

FIG. 11 shows an image correlation judging circuit 1 of the brightness signal/color signal separating circuit according to the fifth embodiment of this invention.

In this embodiment, the output DCH of the horizontal color signal non-correlative energy extracting circuit 1527 is, after being multiplied by an integer b in a multiplier 1537, supplied to the maximum value circuit 1540, and after being multiplied by an integer f in the multiplier 1531, supplied to the maximum value circuit 1539. Likewise, the output DYH of the horizontal brightness signal non-correlative energy extracting circuit 1528 is, after being multiplied by the integer a, supplied to the maximum value circuit 1540, and after being multiplied by an integer e, supplied to the maximum value circuit 1539.

Similarly, the output DCV of the vertical color signal non-correlative energy extracting circuit 1529, after multiplied by an integer h in the being multiplier 1533, is supplied to the adder 1576, and after being multiplied by an integer d in the multiplier 1535, is supplied to the maximum value circuit 1541. Likewise, the output DYV of the vertical brightness signal non-correlative energy extracting circuit 1530, after being multiplied by an integer g in the multiplier 1534, is supplied to the adder 1576, and after being multiplied by an integer c, is supplied to the maximum value circuit 1541.

The maximum value circuit 1540 compares the b*DCH with the a*DYH, and selects and outputs the larger one to the comparing circuit 1546 as second horizontal non-correlative energy DH2.

The maximum value circuit 1539 compares the f*DCH with the e*DYH and outputs the result as third horizontal non-correlative energy DH3. This in turn, is supplied to the comparing circuit 1545 of the color signal extraction controlling circuit 1548 after being multiplied by an integer m in the multiplier 1544.

The adder 1576 adds the h*DCV to the g*DYV and outputs the added result as a third vertical non-correlative energy DV3, which is supplied to the comparing circuit 1546 of the color signal extraction controlling circuit 1548 after being multiplied by an integer n in the multiplier 1545.

The maximum value circuit 1541 compares the d*DCV with the c*DYV, and selects and outputs the larger one to the comparing circuit 1545 as second vertical non-correlative energy DV2.

The comparing circuit 1546 compares the DH2 with the n*DV3, and, if DH2≧n*DV3, it outputs a high level signal 115 to the judging circuit 1547 of the color signal extraction controlling circuit 1548 indicating that there is vertical correlation and no horizontal correlation; and contrastingly, if DH2<n*DV3, it outputs a low level signal 11 to the judging circuit 1547 indicating that there is no vertical correlation.

Similarly, the comparing circuit 1545 compares the DV2 with the m*DH3, and, if DV2≧m*DH3, it outputs a high level signal 114 to the judging circuit 1547 indicating that there is horizontal correlation and no vertical correlation; and contrastingly, if DV2≦m*DH3, it outputs low level signal 114 to the judging circuit 114 indicating that there is no horizontal correlation. The judging circuit 114 operates in same manner as the aforementioned fourth embodiment.

Accordingly, also in this embodiment, the switching circuit 23 functions according to the TABLE 1 and similar effect can be rendered.

Figure 12:
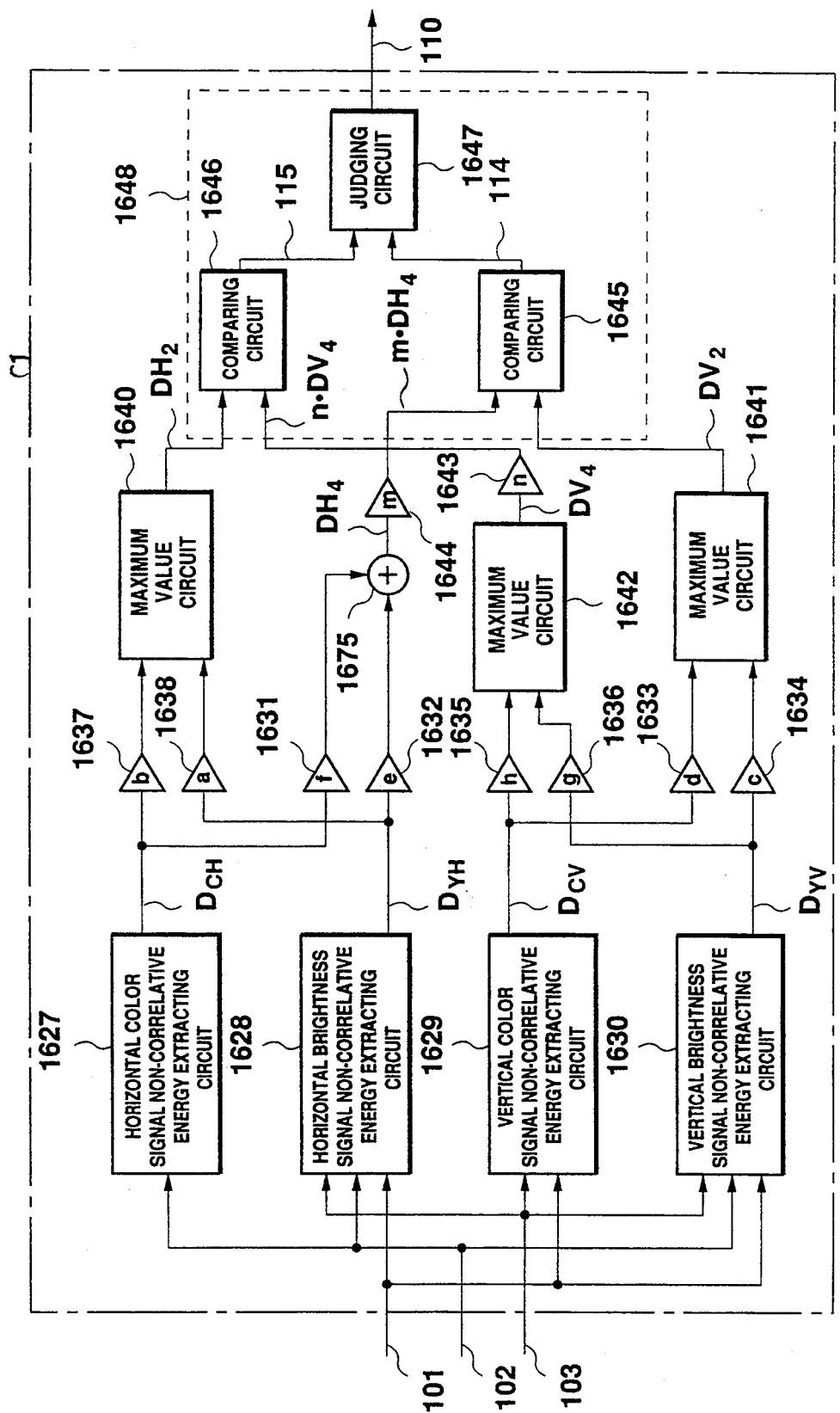
FIG. 12 is a block diagram of an image correlation judging circuit according to the sixth embodiment.

FIG. 12 shows an image correlation judging circuit 1 of the brightness signal/color signal separating filter according to the sixth embodiment of this invention.

This embodiment differs from the fifth embodiment in that the maximum value circuit 1539 in the fifth embodiment is replaced by an adder 1675, and the adder 1576 in the fifth embodiment is replaced by a maximum value circuit 1642. Also the same effect can be obtained by this embodiment.

Figure 13:
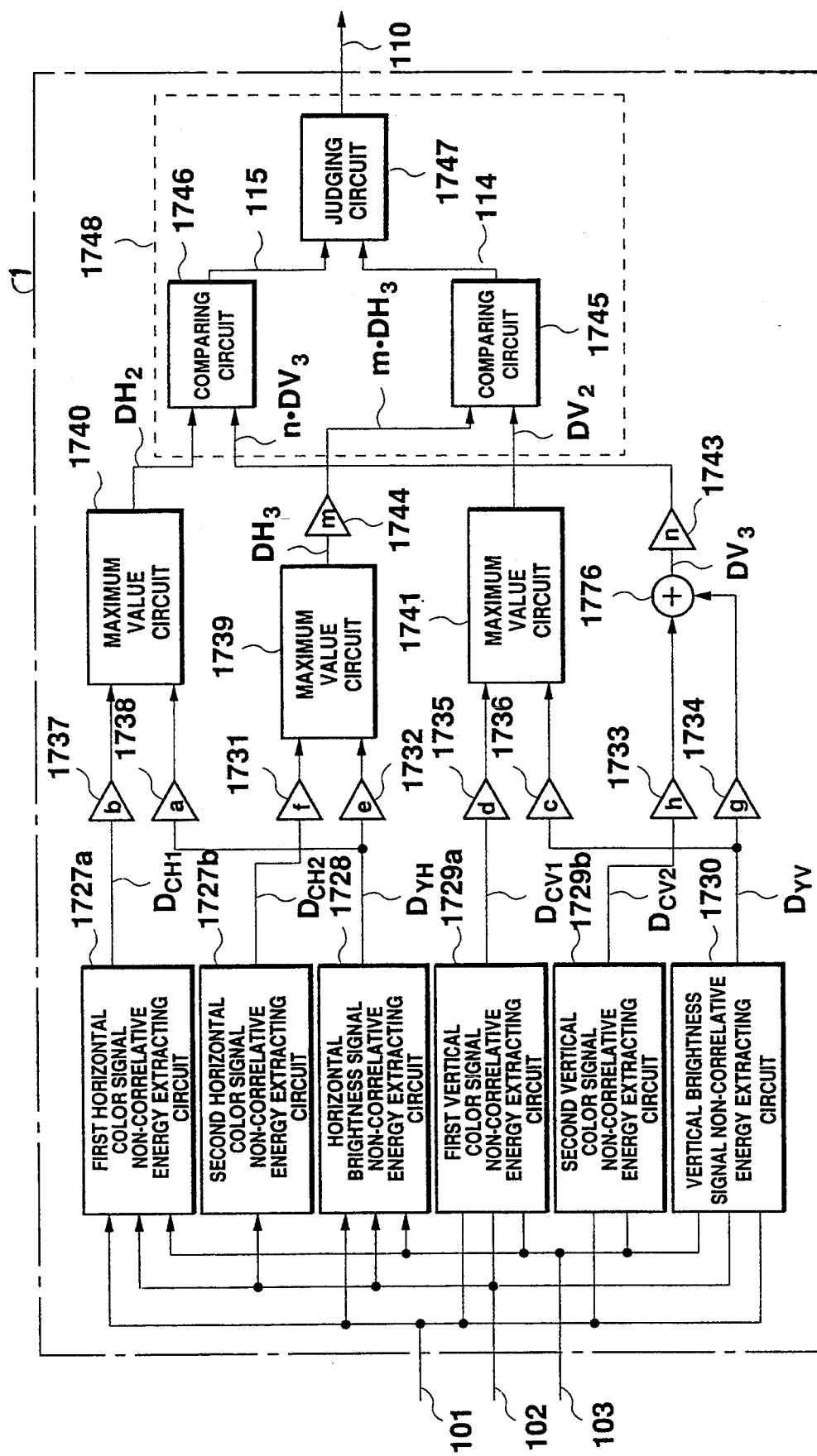
FIG. 13 is a block diagram of an image correlation judging circuit according to the seventh embodiment.

FIG. 13 shows an image correlation judging circuit 1 of the brightness signal/color signal separating filter according to a seventh embodiment of this invention.

This embodiment features to dividedly compose the horizontal color signal non-correlative energy extracting circuit 1527 and the vertical color signal non-correlative energy extracting circuit 1529 respectively into two sub-circuits having mutually different characteristics.

Among the two sub-circuits of the horizontal color signal non-correlative energy extracting circuit 1727, the one 1727a supplies the output DCH1 to the maximum value circuit 1740, and the other 1727b supplies the output DCH2 to the maximum value circuit 1739. Similarly, the one sub-circuit 1729a of the vertical color signal non-correlative energy extracting circuit 1729 supplies the output DCV1 to the maximum value circuit 1741, and the other 1729b supplies the output DCV2 to the adder 1776.

The switching circuit 23 of this embodiment also functions according to the TABLE 1, and can render same effect as in the aforesaid embodiments.

Figure 14:
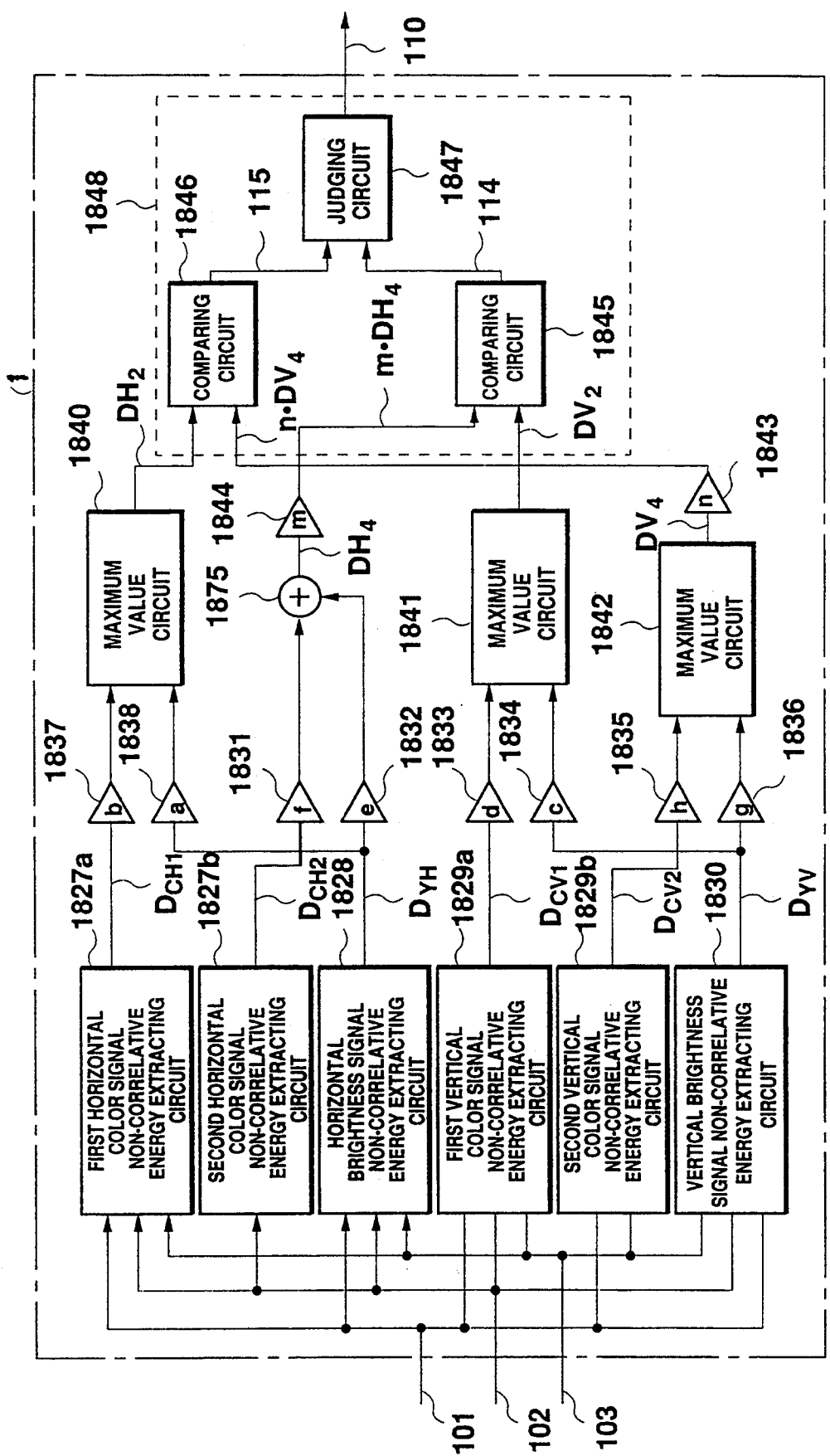
FIG. 14 is a block diagram of an image correlation judging circuit according to the eighth embodiment.

FIG. 14 shows an image correlation judging circuit of the brightness signal/color signal separating filter according to the eighth embodiment of this invention.

This embodiment features to dividedly compose the horizontal color signal non-correlative energy extracting circuit 1827 and the vertical color signal non-correlative energy extracting circuit 1829 in the sixth embodiment shown in FIG. 12, each into two sub-circuits having mutually different characteristics, similar to the seventh embodiment shown in FIG. 13.

Also in this embodiment, the switching circuit 23 functions according to the TABLE 1, rendering same effect as in the aforesaid embodiments.

Figure 18:
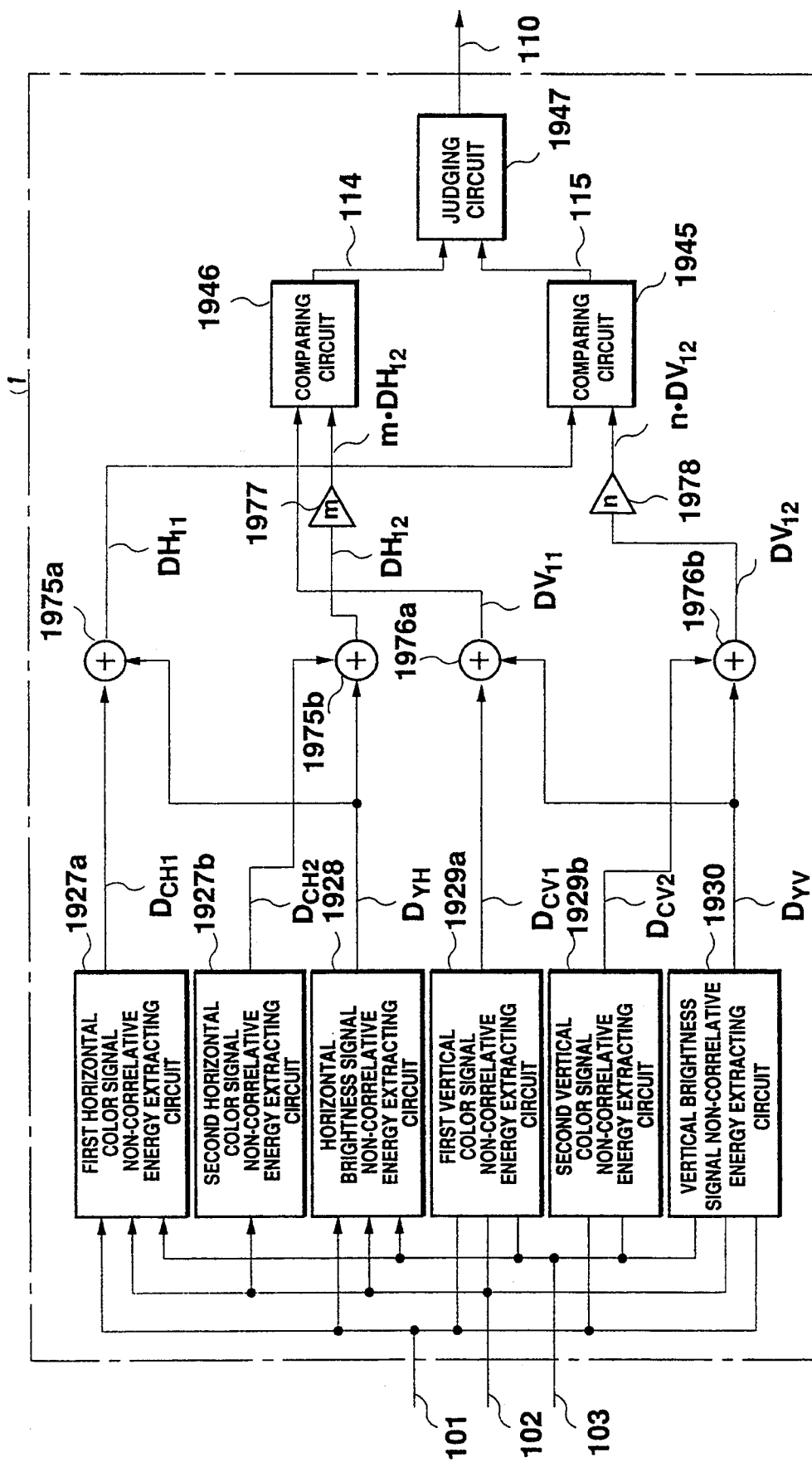
FIG. 18 is a block diagram of an image correlation judging circuit according to the ninth embodiment.

FIG. 18 shows an image correlation judging circuit 1 according to the ninth embodiment of this invention.

Likewise to the third embodiment shown in FIG. 9, this embodiment uses adders 1975, 1976 and multipliers 1977, 1978, and likewise to the seventh embodiment shown in FIG. 13, this embodiment includes a horizontal color signal non-correlative energy extracting circuit 1927 and a vertical color signal non-correlative energy extracting circuit 1929.

Namely, this embodiment has two horizontal color signal non-correlative energy extracting circuits 1927a, 1927b, and the former outputs DCH1 based on three types of signals 101, 102, and 103, and the latter outputs DCH2 based on a signal 102.

These outputs DCH1 and DCH2 are supplied to the adder 1975a along with the output DYH from the horizontal brightness signal non-correlative energy extracting circuit 1928.

The adder 1975a adds the output DCH1 of the horizontal color signal non-correlative energy extracting circuit 1927a with the output DYH of the horizontal brightness signal non-correlative energy extracting circuit 1928, and outputs the added result as horizontal non-correlative energy DH11 to the comparing circuit 1945.

The adder 1975b adds the output DCH2 of the horizontal color signal non-correlative energy extracting circuit 1927b with the output DYH of the horizontal brightness signal non-correlative energy extracting circuit 1928, and outputs the added result as horizontal non-correlative energy DH12. This energy is then multiplied by a constant m, and the multiplied result is supplied to the comparing circuit 1946.

On the other hand, this embodiment includes two vertical color signal non-correlative energy extracting circuits 1929a, 1929b, and the former outputs DCV 1 based on three kinds of signals 101, 102, and 103, while the latter outputs DCV2 based on signals 101 and 102.

These outputs DCV1 and DCV2 enter the adders 1976a and 1976b, respectively, along with the output DYV of the vertical brightness signal non-correlative energy 1930.

The adder 1976a adds the output DCV1 of the vertical color signal non-correlative energy extracting circuit 1929a with the output DYV of the vertical brightness signal non-correlative energy extracting circuit 1930, and outputs the added result as vertical non-correlative energy DV11 to the comparaing circuit 1946.

The adder 1976b adds the output DCV2 of the vertical color signal non-correlative energy extracting circuit 1929b with the output DYV of the vertical brightnes signal non-correlative energy extracting circuit 1930, and outputs the added result as vertical non-correlative energy DV12. This energy DV12 is then multiplied by a constant n in the multiplier 1978 and thereafter is outputted to the comparing circuit 1945.

The comparing circuits 1945 and 1946, as the other embodiments mentioned earlier, make judgement on the basis of the DH11, m*DH12, DV1 and n*DV12.

Namely, the comparing circuit 1945, judges that there is vertical correlation without horizontal correlation and outputs high level signal 115 to the judging circuit 1947 if DH11≧n*DV12. On the contrary, it judges that there is no vertical correlation and outputs low level signal 115 to the judging circuit 1947 if DH11<n*DV12.

Likewise, the comparing circuit 1946 judges that there is horizontal correlation without vertical correlation and outputs high level signal 114 to the judging circuit 1947 if DV11≧m*DH12. On the contrary, it judges that there is no horizontal correlation and outputs low level signal to the judging circuit 1947 if DV11<m*DH12.

Therefore, also in this embodiment, the switching circuit operates according to the TABLE 1, rendering the same effect as in the aforesaid embodiments.

Figure 19:
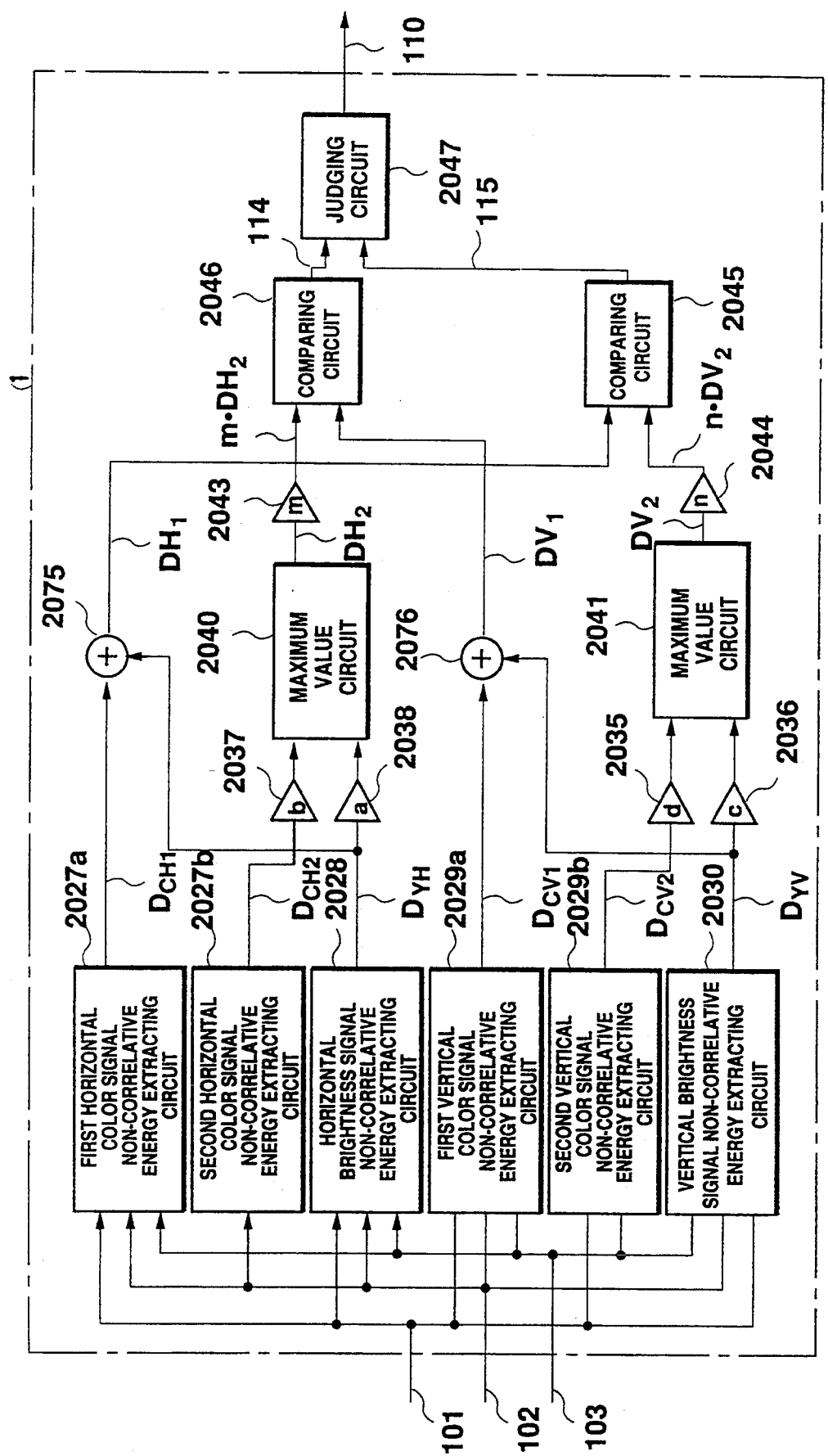
FIG. 19 is a block diagram of an image correlation judging circuit according to the tenth embodiment.

FIG. 19 shows an image correlation judging circuit 1 according to a tenth embodiment of this invention.

This embodiment has such a composition that the adders 1975a and 1976b are replaced by the same 2075 and 2076 respectively, and likewise the adders 1975b and 1976b are replaced by the maximum value circuit 2040 and 2041, respectively. Further, multipliers 2037, 2038 and 2035, 2036 are provided before the maximum value circuits 2040 and 2041, respectively.

Accordingly, in this embodiment too, the comparing circuits 2045, 2046 operates along the same logic as the ninth embodiment, and the switching circuit functions according to the TABLE 1.

Namely, the output DCH1 of the horizontal color signal non-correlative energy extracting circuit 2027a enters the adder 2075 along with the output DYH of the horizontal brightness signal non-correlative energy extracting circuit 2028. The adder 2075 adds the output DCH1 of the horizontal color signal non-correlative energy extracting circuit 2027a with the output DYH of the horizontal brightness signal non-correlative energy extracting circuit 2028, and outputs the added result as horizontal non-correlative energy DH1 to the comparing circuit 2045.

Meanwhile, the output DCH2 of the horizontal color signal non-correlative energy extracting circuit 2027b is multiplied by a constant b in the multiplier 2037 and thereafter is supplied to the maximum value circuits 2040. The value, obtained by multiplying the output DYH of the horizontal brightness signal non-correlative energy extracting circuit 2028 by a constant a in the multiplier 2038, is also supplied to the maximum value circuit 2040.

The maximum value circuit 2040 compares the b*DCH with a*DYH, and selects and outputs the larger one as horizontal non-correlative energy DH2 to the comparing circuit 2046 through the multiplier 2043. The multiplier 2043 multiplies the horizontal non-correlative energy DH2 by a constant m.

The output DCV2 of the vertical color signal non-correlative energy extracting circuit 2029b and the output DYV of the vertical brightness signal non-correlative energy extracting circuit 2030 are supplied to the maximum circuit 2041 via the multiplier 2035 and 2036 respectively. The multipliers 2035 and 2036 multiply the DCV2 and the DYV by constants d and c, respectively. The maximum value circuit 2041 compares both of these, and outputs the obtained maximum value max (d*DCV2, c*DYV) as vertical non-correlative energy DV2. This is then multiplied by a constant n in the multiplier 2044 and is supplied to the comparing circuit 2045.

The comparing circuit 2046, if m*DH2>DV1, outputs a high level signal 114 to the judging circuit 2047 regarding that there is vertical correlation without horizontal correlation. On the contrary, if m*DH2≦DV1, it outputs a low level signal 114 to the judging circuit 2047 regarding that there is no vertical correlation.

The comparing circuit 2045, if n*DV2>DH1, outputs high level signal 115 regarding that there is horizontal correlation without vertical correlation. On the contrary, if n*DV2≦DH1, it outputs low level signal to the judging circuit 2047 regarding that there is no horizontal correlation.

Therefore, also in this embodiment, the switching circuit operates according to the TABLE 1, rendering the same effects as embodiments earlier mentioned.

Although in the embodiments described above, the composite color television signal has been sampled at quadruple the frequency of the color subcarrier concorded with the horizontal scan frequency, any other frequency than such quadruple frequency can be used for sampling, on the condition that the sampling points are arranged in grids on the screen.

It should be noted that the digital filter used in the embodiments is nothing more than exemplary, and other means e.g. one composed of multiple filters, can also be used.

Figure 15:
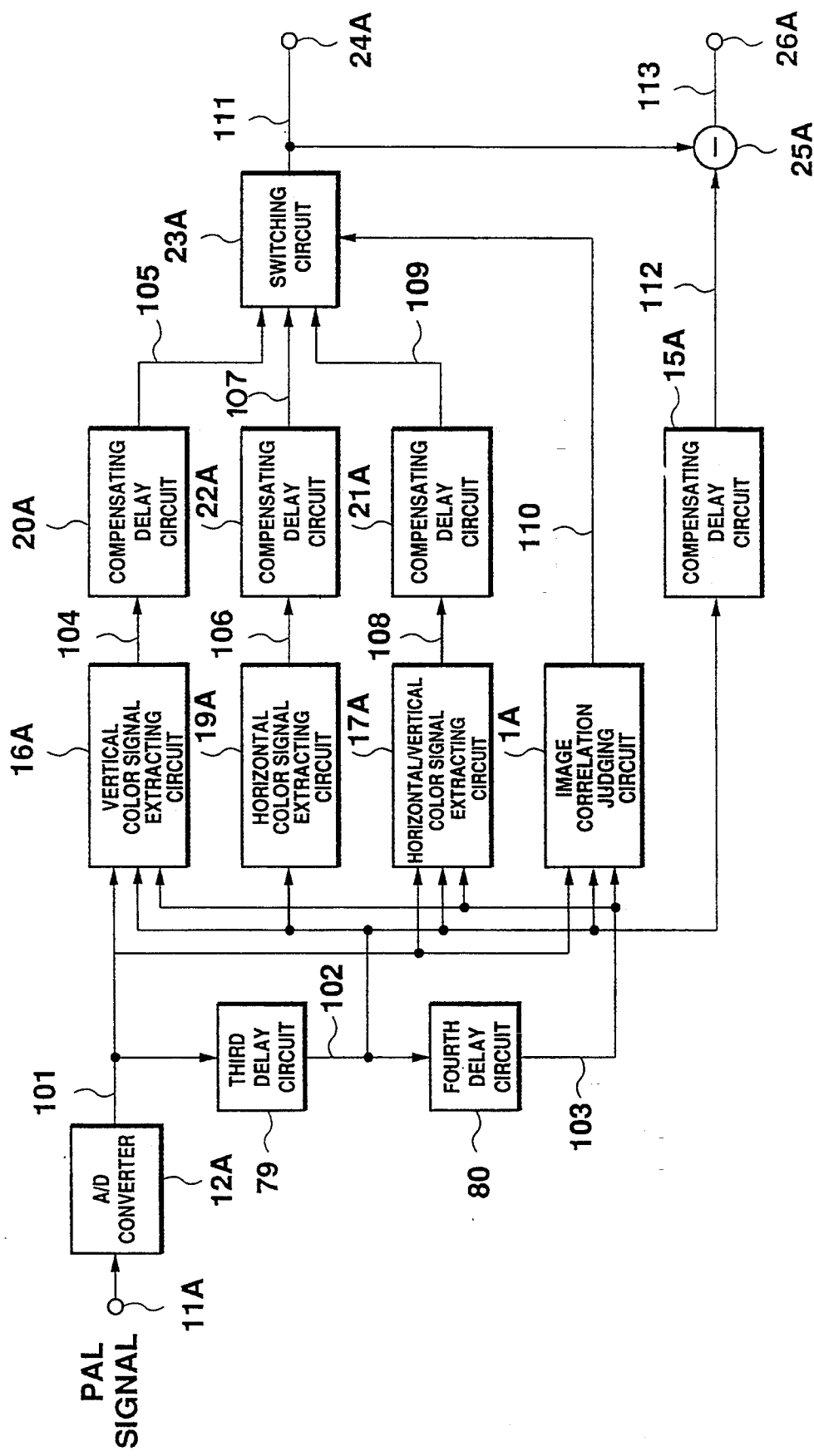
FIG. 15 is a block diagram of an color signal/brightness signal separating filter according to the second embodiment, for separating the composite color television signal of PAL type.
Figure 16:
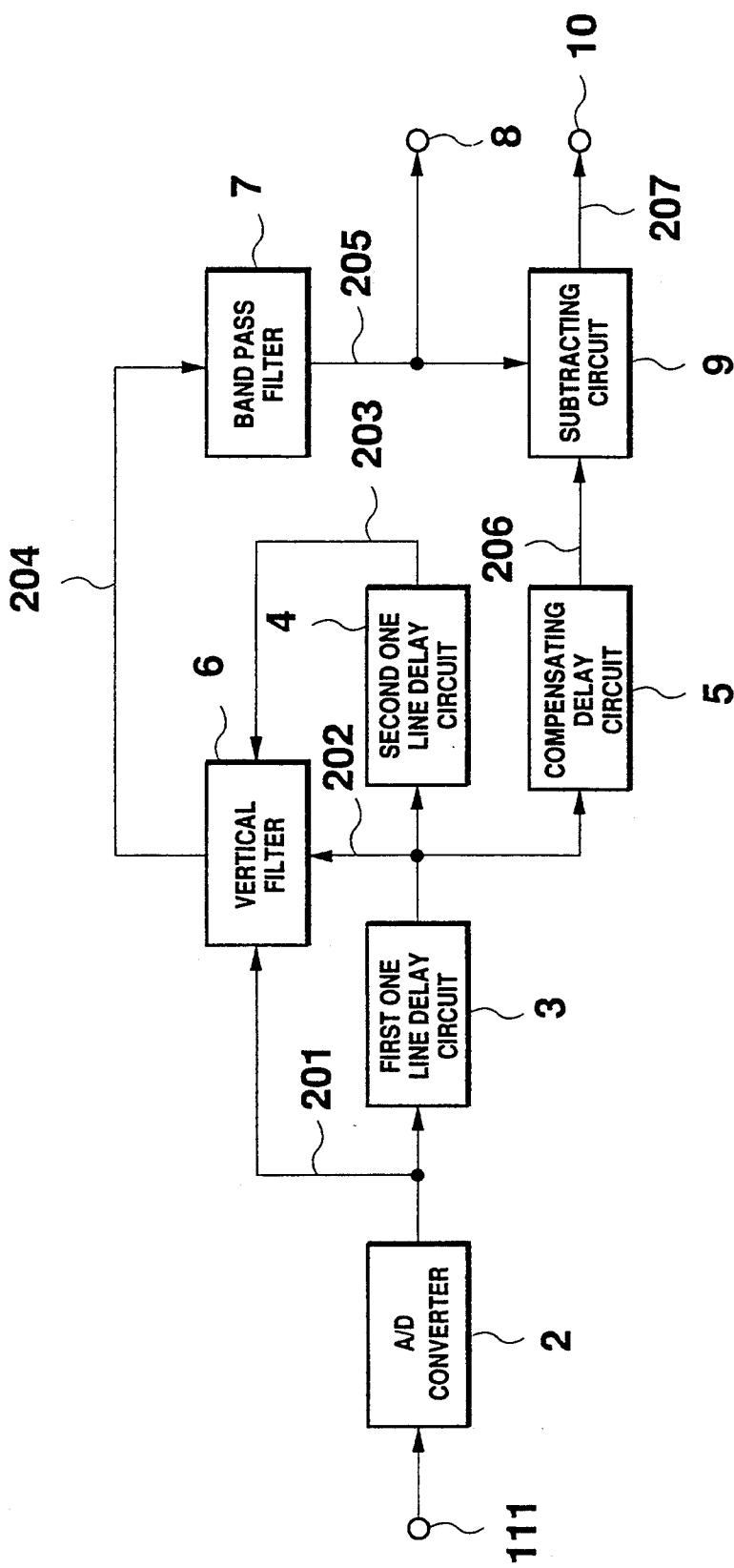
FIG. 16 is a block diagram showing a conventional brightness signal/color signal separating filter.

Further, despite that the embodiments described on NTSC type brightness signal/color signal separating filter, it is also possible, as shown in FIG. 15, to apply the composition to PAL type filter using a two line-delay of the composite color television signal by a third delay circuit 79 and a fourth delay circuit 80, instead of the one line-delay by the first delay circuit 13 and the second delay circuit 14 in FIG. 1, with other components being the same as FIG. 1. The same effect can be obtained by this design, too.

Still further, the FIR filter, which constituted the digital filters in the embodiments can be substituted by the IIR filter.

As described above, according to this invention, since the brightness signal/color signal separating filter is properly used depending on the vertical and horizontal image correlations of composite color television signal, the undesirable influence caused by mutual leakage of brightness signal and color signal to the another's channel can be reduced, thereby minimizing the dot jamming.

What is claimed is:

1. A brightness signal/color signal separating filter for separating a brightness signal and a color signal from an input composite color television signal, comprising:
   a first delay circuit for outputting a first delay composite television signal generated by delaying the input composite color signal by a predetermined number of lines;

a second delay circuit for outputting a second delay composite color television signal generated by further delaying the input composite color signal delayed by said first delay circuit by an equal number of lines as delayed in said first delay circuit;

a vertical color signal extracting filter for extracting vertical color signal from the input composite color television signal, first delay composite color television signal, and second delay composite color television signal;

a horizontal color signal extracting filter for extracting horizontal color signal from the first delay composite color television signal;

a horizontal/vertical color signal extracting filter for extracting horizontal and vertical color signals from said input, first delay and second delay composite color television signals;

a switching circuit for selectively outputting any one of outputs from said vertical color signal extracting filter, horizontal color signal extracting filter, and horizontal/vertical color signal extracting filter; and an image correlation judging circuit for comparatively judging correlation of an image by said input, first delay and second delay composite color television signals in the vertical and horizontal directions, and for outputting horizontal color signal when horizontal correlation in strong, for outputting vertical color signal when vertical correlation is strong and the horizontal correlation is weak, and for outputting both horizontal and vertical color signals when both the horizontal and vertical correlations are weak, respectively, from said switching circuit;

said image correlation judging circuit including,
  (a) non-correlative energy extracting means for extracting horizontal color signal non-correlative energy representative of correlative strength of the horizontal color signal, horizontal brightness signal non-correlative energy representative of correlative strength of the horizontal brightness signal, vertical color signal non-correlative energy representative of correlative strength of the vertical color signal, and vertical brightness signal non-correlative energy representative of correlative strength of the vertical brightness signal;
  (b) comparative signal generating means for generating four comparative signals representative of vertical and horizontal correlative strengths of the composite color television signal, one based on horizontal color signal non-correlative energy, horizontal brightness signal non-correlative energy, vertical color signal non-correlative energy, and vertical brightness signal non-correlative energy, respectively,
  (c) comparative judging means for comparatively judging the horizontal and vertical correlative strengths of the composite color television signal, and for controlling said switching circuit to output horizontal color signal extracted by the horizontal color signal extracting circuit when the horizontal correlation is strong, vertical color signal extracted by the vertical color signal extracting filter when vertical correlation is stronger than horizontal correlation, and horizontal/vertical color signals extracted by the horizontal/vertical color signal extracting filter when both the horizontal and vertical correlations are weak.

2. A brightness signal/color signal separating filter according to claim 1, wherein said input composite color television signal is an NTSC (National Television System Committee) signal.

3. A brightness signal/color signal separating filter according to claim 2, wherein said non-correlative energy extracting means comprises:
  (a) a horizontal color signal non-correlative energy extracting circuit for extracting horizontal color signal non-correlative energy from the first delayed composite color television signal;
  (b) a horizontal brightness signal non-correlative energy extracting circuit for extracting horizontal brightness signal non-correlative energy from the input composite color television signal, the first delayed composite color television signal and the second delayed composite color television signal;
  (c) a vertical color signal non-correlative energy extracting circuit for extracting vertical color signal non-correlative energy from the input composite color television signal, and the second delayed composite color television signal; and
  (d) a vertical brightness signal non-correlative energy extracting circuit for extracting vertical brightness signal non-correlative energy from the input composite color television signal, the first delayed composite color television signal, and the second delayed composite color television signal.

4. A brightness signal/color signal separating filter according to claim 3, wherein each of said horizontal color signal non-correlative energy extracting circuit, said horizontal brightness signal non-correlative energy extracting circuit, said vertical color signal non-correlative energy extracting circuit and said vertical brightness signal non-correlative energy extracting circuit is a finite impulse response filter.

5. A brightness signal/color signal separating filter according to claim 4, wherein said horizontal color signal non-correlative energy extracting circuit further comprises:
  delay means for delaying the first delayed composite color television signal by one cycle of a color subcarrier;
  subtracting means for subtracting an output of said delay means from input to said delay means;
  absolute value calculating means for calculating an absolute value of an output of said subtracting means and for outputting the absolute value as horizontal color signal non-correlative energy.

6. A brightness signal/color signal separating filter according to claim 4, wherein said horizontal brightness signal non-correlative energy extracting circuit further comprises:
  a vertical low pass filter for low pass-filtering the inputted composite color television signal, the first delayed composite color television signal and the second delayed composite color television signal;
  first delay means for delaying and subsequently outputting an output of said vertical low pass filter by a half of a cycle of the color subcarrier;
  second delay means for delaying the output of said first delay means by a half of the cycle of the color subcarrier;
  first subtracting means for subtracting the output of said first delay means from an output of said vertical low pass filter;

second subtracting means for subtracting and subsequently outputting an output of said second delay means from the output of said first delay means;

first absolute value calculating means for calculating and subsequently outputting an absolute value of an output of said first subtracting means;

second absolute value calculating means for calculating and subsequently outputting an absolute value of the output of said second subtracting means; and maximum value calculating means for selecting a larger of the outputs of said first absolute value calculating means and said second absolute value calculating means and for outputting the larger as horizontal brightness signal non-correlative energy.

7. A brightness signal/color signal separating filter according to claim 4, wherein said vertical color signal non-correlative energy extracting circuit further comprises:

a first horizontal band pass filter for band pass-filtering and subsequently outputting the input composite color television signal;

a second horizontal band pass filter for band filtering and subsequently outputting the second delayed composite color television signal;

subtracting means for subtracting an output of said second vertical band pass filter from an output of said first vertical band pass filter; and absolute value calculating means for calculating and subsequently outputting an absolute value of the output of said subtracting means as vertical color signal non-correlative energy.

8. A brightness signal/color signal separating filter according to claim 4, wherein said vertical brightness signal non-correlative energy extracting circuit further comprises:

a first horizontal low pass filter for low pass-filtering and subsequently outputting the input composite color television signal;

a second horizontal low pass filter for low pass-filtering and subsequently outputting the first delayed composite color television signal;

a third horizontal low pass filter for low pass-filtering and subsequently outputting the second delayed composite color television signal;

first subtracting means for subtracting and subsequently outputting the output of said second horizontal low pass filter from the output of said first horizontal low pass filter;

second subtracting means for subtracting and subsequently outputting the output of said third horizontal low pass filter from the output of said second horizontal low pass filter;

first absolute value calculating means for calculating and subsequently outputting an absolute value of the output of said first subtracting means;

second absolute value calculating means for calculating and subsequently outputting an absolute value of the output of said second subtracting means; and maximum value calculating means for selecting a larger of the outputs of said first absolute value calculating means and said second absolute value calculating means and outputting the larger as vertical brightness signal non-correlative energy.

9. A brightness signal/color signal separating filter according to claim 2, wherein said comparative judging means further comprises:

a first comparing circuit for comparing the first comparative signal with the third comparative signal, and for judging the vertical correlation as strong and the horizontal correlation as weak when the first comparative signal is larger than the third comparative signal, and for judging the vertical correlation as weak when the third comparative signal is larger than the first comparative signal;

a second comparing circuit for comparing the second comparative signal with the fourth comparative signal, and for judging the horizontal correlation as weak when the second comparative signal is larger than the fourth comparative signal, and for judging the horizontal correlation as strong and the vertical correlation as weak when the fourth comparative signal is larger than the second comparative signal; and a judging circuit for controlling said switching circuit based on the compared results by said first comparing circuit and said second comparing circuit.

10. A brightness signal/color signal separating filter according to claim 9, wherein:

said first comparing circuit comprises a means for outputting the value "1" when judging the vertical correlation as strong and the horizontal correlation as weak, and for outputting the value "0" when judging the vertical correlation as weak;

said second comparing means comprises a means for outputting the value "1" when judging the horizontal correlation as strong and the vertical correlation as weak, and for outputting the value "0" when judging the horizontal correlation as weak; and said judging means further including a first NOT circuit for rendering a logical negation of an output of said first comparing circuit, a second NOT circuit for rendering a logical negation of an output of said second comparing circuit, a first AND circuit for rendering a logical product of an output of said first comparing circuit and an output of said second NOT circuit, and a second AND circuit for rendering a logical product of an output of said second comparing circuit and an output of said first NOT circuit.

11. A brightness signal/color signal separating filter according to claim 2, wherein said comparative signal generating means comprises:

a first multiplier for multiplying the horizontal color signal non-correlative energy by a predetermined first constant and outputting the multiplied result;

a second multiplier for multiplying the horizontal brightness signal non-correlative energy by a predetermined second constant and outputting the multiplied result;

a third multiplier for multiplying the horizontal color signal non-correlative energy by a predetermined third constant, different from the first constant, and outputting the multiplied result;

a fourth multiplier for multiplying the horizontal brightness signal non-correlative energy by a predetermined fourth constant, different from the second constant, and outputting the multiplied result;

a fifth multiplier for multiplying the vertical color signal non-correlative energy by a predetermined fifth constant and outputting the multiplied result;

a sixth multiplier for multiplying the vertical brightness signal non-correlative energy by a predetermined sixth constant and outputting the multiplied result;

a seventh multiplier for multiplying the vertical color signal non-correlative energy by a predetermined seventh constant, different from the fifth constant, and outputting the multiplied result;

an eighth multiplier for multiplying the vertical brightness signal non-correlative energy by a predetermined eighth constant, different from the sixth constant, and outputting the multiplied result;

a first maximum value circuit for comparing the output of said first multiplier with the output of the second multiplier, and for selecting and outputting the larger as the first comparative signal;

a second maximum value circuit for comparing the output of the third multiplier with the output of the fourth multiplier, and for selecting and outputting the larger;

a third maximum circuit for comparing the output of said fifth multiplier with the output of the sixth multiplier, and for selecting and outputting the larger;

a fourth maximum circuit for comparing the output of said seventh multiplier with the output of said eighth multiplier, and for selecting and outputting the larger as the fourth comparative signal;

a ninth multiplier for multiplying the output of said second maximum value circuit by a predetermined ninth constant and for outputting the multiplied result as the second comparative signal; and a tenth multiplier for multiplying the output of said third maximum value circuit by a predetermined tenth constant and for outputting the multiplied result as the third comparative signal.

12. A brightness signal/color signal separating filter according to claim 2, wherein said comparative signal generating means comprises:

a first adder for adding the horizontal color signal non-correlative energy to the horizontal brightness signal non-correlative energy and for outputting the added result as the second comparative signal;

a second adder for adding the vertical color signal non-correlative energy to the vertical brightness signal non-correlative energy and for outputting the added result as the third comparative signal;

a first multiplier for multiplying the second comparative signal by a predetermined constant and for outputting the multiplied result as the first comparative signal; and a second multiplier for outputting the third comparative signal by a predetermined constant and for outputting the multiplied result as the fourth comparative signal.

13. A brightness signal/color signal separating filter according to claim 2, wherein said comparative signal generating means further comprises:

a first multiplier for multiplying the horizontal color signal non-correlative energy by a predetermined constant and for outputting the multiplied value;

a second multiplier for multiplying the horizontal brightness signal non-correlative energy by a predetermined value and for outputting the multiplied value;

a third multiplier for multiplying the vertical color signal non-correlative energy by a predetermined constant and for outputting the multiplied value;

a fourth multiplier for multiplying the vertical brightness signal non-correlative energy by a predetermined constant and for outputting the multiplied value;

a first maximum value circuit for comparing the output of said first multiplier with the output of said second multiplier, and for selecting and outputting the larger;

a first adder for adding the horizontal color signal non-correlative energy with the horizontal brightness signal non-correlative energy, and for outputting the added result as the second comparative signal;

a second adder for adding the vertical color signal non-correlative energy and the vertical brightness signal non-correlative energy, and for outputting the added result as the third comparative signal;

a second maximum value circuit for comparing the output of said third multiplier with the output of said fourth multiplier, and for selecting and outputting the larger;

a fifth multiplier for multiplying the output of said first maximum value circuit by a predetermined constant and for outputting the multiplied result as the first comparative signal;

a sixth multiplier for multiplying the output of said second maximum value circuit by a predetermined constant and for outputting the multiplied result as the fourth comparative signal.

14. A brightness signal/color signal separating filter according to claim 2, wherein said comparative signal generating means comprises:

a first multiplier for multiplying the horizontal color signal non-correlative energy by a predetermined first constant and for outputting the multiplied result;

a second multiplier for multiplying the horizontal brightness signal non-correlative energy by a predetermined second constant and for outputting the multiplied result;

a third multiplier for multiplying the horizontal color signal non-correlative energy by a predetermined third constant, different from the first constant, and for outputting the multiplied result;

a fourth multiplier for multiplying the horizontal brightness signal non-correlative energy by a predetermined fourth constant, different from the second constant, and for outputting the multiplied result;

a fifth multiplier for multiplying the vertical color signal non-correlative energy by a predetermined fifth constant and for outputting the multiplied result;

a sixth multiplier for multiplying the vertical brightness signal non-correlative energy by a predetermined sixth constant and for outputting the multiplied result;

a seventh multiplier for multiplying the vertical color signal non-correlative energy by a predetermined seventh constant, different from the fifth constant, and for outputting the multiplied result;

an eighth multiplier for multiplying the vertical brightness signal non-correlative energy by a predetermined eighth constant, different from the sixth constant, and for outputting the multiplied result;

a first maximum value circuit for comparing the output of said first multiplier with the output of said second multiplier, and for selecting and outputting the larger as the first comparative signal;

a second maximum value circuit for comparing the output of said third multiplier with the output of said fourth multiplier, and for selecting and outputting the larger;

an adder for adding the output of said fifth multiplier to the output of said sixth multiplier and for outputting the added result;

a third multiplier for comparing the output of said seventh multiplier and the output of said eighth multiplier, and for selecting and outputting the larger as the fourth comparative signal;

a ninth multiplier for multiplying the output of said second maximum value circuit by a predetermined ninth constant and for outputting the multiplied result as the second comparative signal;

a tenth multiplier for multiplying the output of said adder by a predetermined tenth constant and for outputting the multiplied result as the third comparative signal.

15. A brightness signal/color signal separating filter according to claim 2, wherein said comparative signal generating means comprises:

a first multiplier for multiplying the horizontal color signal non-correlative energy by a predetermined first constant and for outputting the multiplied result;

a second multiplier for multiplying the horizontal brightness signal non-correlative energy by a predetermined second constant and for outputting the multiplied result;

a third multiplier for multiplying the horizontal color signal non-correlative energy by a predetermined third constant, different from the first constant, and for outputting the multiplied result;

a fourth multiplier for multiplying the horizontal brightness signal non-correlative energy by a predetermined fourth constant, different from the second constant, and for outputting the multiplied result;

a fifth multiplier for multiplying the vertical color signal non-correlative energy by a predetermined fifth constant and for outputting the multiplied result;

a sixth multiplier for multiplying the vertical brightness signal non-correlative energy by a predetermined sixth constant and for outputting the multiplied result;

a seventh multiplier for multiplying the vertical color signal non-correlative energy by a predetermined seventh constant, different from the fifth constant, and for outputting the multiplied result;

an eighth multiplier for multiplying the vertical brightness signal non-correlative energy by a predetermined eighth constant, different from the sixth constant, and for outputting the multiplied result;

a first maximum value circuit for comparing the output of said first multiplier with the output of said second multiplier, and for selecting and outputting the multiplied result as the first comparative signal;

an adder for adding the output of said third multiplier to the output of said fourth multiplier;

a second maximum value circuit for comparing the output of said fifth multiplier with the output of said sixth multiplier, and for selecting and outputting the larger;

a third maximum value circuit for comparing the output of said seventh multiplier with the output of said eighth multiplier, and for selecting and outputting the larger as the fourth comparative signal;

a ninth multiplier for multiplying the output of said adder by a predetermined ninth constant and for outputting the multiplied result as a second comparative signal;

a tenth multiplier for multiplying the output of said second maximum value circuit by a predetermined tenth constant and for outputting the multiplied result as a third comparative signal.

16. A brightness signal/color signal separating filter according to claim 1, wherein said input composite color television signal is a PAL signal.

17. A brightness signal/color signal separating filter according to claim 2, wherein said non-correlative energy extracting means comprises:

(a) a first horizontal color signal non-correlative energy extracting circuit for extracting first horizontal color signal non-correlative energy from the input composite color television signal, the first delayed composite color television signal, and the second delayed composite color television signal;

(b) a second horizontal color signal non-correlative energy extracting circuit for extracting second horizontal color signal non-correlative energy from the first delayed composite color television signal;

(c) a horizontal brightness signal non-correlative energy extracting circuit for extracting horizontal brightness signal non-correlative energy from the input composite color television signal, the first delayed composite color television signal and the second delayed composite color television signal;

(d) a first vertical color signal non-correlative energy extracting circuit for extracting first vertical color signal non-correlative energy from the input composite color television signal, the first delayed composite color television signal, and the second delayed composite color television signal;

(e) a second vertical color signal non-correlative energy extracting circuit for extracting second vertical color signal non-correlative energy from the input composite color television signal and the second delayed composite color television signal;

(f) a vertical brightness signal non-correlative energy extracting circuit for extracting vertical brightness signal non-correlative energy from the input composite color television signal and the second delayed composite color television signal.

18. A brightness signal/color signal separating filter according to claim 17, wherein said comparative signal generating means comprises:

a first multiplier for multiplying the first horizontal color signal non-correlative energy by a predetermined first constant and for outputting the multiplied result;

a second multiplier for multiplying the horizontal brightness signal by a predetermined second constant and for outputting the multiplied result;

a third multiplier for multiplying the second horizontal color signal non-correlative energy by a predetermined third constant and for outputting the multiplied result;

a fourth multiplier for multiplying the horizontal brightness signal non-correlative energy by a predetermined fourth constant, different from the second constant, and for outputting the multiplied result;

a fifth multiplier for multiplying the first vertical color signal non-correlative energy by a predetermined fifth constant and for outputting the multiplied result;

a sixth multiplier for multiplying the vertical brightness signal non-correlative energy by a predetermined sixth constant and for outputting the multiplied result;

a seventh multiplier for multiplying the second vertical color signal non-correlative energy by a predetermined seventh constant and for outputting the multiplied result;

an eighth multiplier for multiplying the vertical brightness signal non-correlative energy by a predetermined eighth constant, different from the sixth constant, and for outputting the multiplied result;

a first maximum value circuit for comparing the output of said first multiplier with the output of said second multiplier, and for selecting and outputting the larger as the first comparative signal;

a second maximum value circuit for comparing the output of said third multiplier with the output of said fourth multiplier, and for selecting and outputting the larger;

a third maximum value circuit for comparing the output of said fifth multiplier with the output of said sixth multiplier, and for selecting and outputting the larger as the third comparative signal;

a fourth maximum value circuit for comparing the output of said seventh multiplier with the output of said eighth multiplier, and for selecting and outputting the larger;

a ninth multiplier for multiplying the output of said second maximum value circuit by a predetermined constant and for outputting the multiplied result as a second comparative signal;

a tenth multiplier for multiplying the output of said fourth maximum value circuit by a predetermined constant and for outputting the multiplied result as the fourth comparative signal.

19. A brightness signal/color signal separating filter according to claim 17, wherein said comparative signal generating means comprises:

a first multiplier for multiplying the first horizontal color signal non-correlative energy by a predetermined first constant and for outputting the multiplied result;

a second multiplier for multiplying the horizontal brightness signal non-correlative energy by a predetermined second constant and for outputting the multiplied result;

a third multiplier for multiplying the second horizontal color signal non-correlative energy by a predetermined third constant and for outputting the multiplied result;

a fourth multiplier for multiplying the horizontal brightness signal non-correlative energy by a predetermined fourth constant, different from the second constant, and for outputting the multiplied result;

a fifth multiplier for multiplying the first vertical color signal non-correlative energy by a predetermined fifth constant and for outputting the multiplied result;

a sixth multiplier for multiplying the vertical brightness signal non-correlative energy by a predetermined sixth constant and for outputting the multiplied result;

a seventh multiplier for multiplying the second vertical color signal non-correlative energy by a predetermined seventh constant and for outputting the multiplied result;

an eighth multiplier for multiplying the vertical brightness signal non-correlative energy by a predetermined eighth constant, different from the sixth constant, and for outputting the multiplied result;

a first maximum value circuit for comparing the output of said first multiplier with the output of said second multiplier and for selecting and outputting the larger as the first comparative signal;

a second maximum value circuit for comparing the output of said third multiplier with output of said fourth multiplier, and for selecting and outputting the larger;

a third maximum value circuit for comparing the output of said fifth multiplier with the output of said sixth multiplier, and for selecting and outputting the larger as the third comparative signal;

an adder for adding the output of said seventh multiplier to the output of said eighth multiplier and for outputting the added result;

a ninth multiplier for multiplying the output of said second maximum value circuit by a predetermined ninth constant and for outputting the multiplied result as the second comparative signal;

a tenth multiplier for multiplying the output of said adder by a predetermined tenth constant and for outputting the multiplied result as the fourth comparative signal.

20. A brightness signal/color signal separating filter according to claim 17, wherein said comparative signal generating means comprises:

a first multiplier for multiplying the horizontal color signal non-correlative energy by a predetermined first constant and for outputting the multiplied result;

a second multiplier for multiplying the horizontal brightness signal non-correlative energy by a predetermined second constant and for outputting the multiplied result;

a third multiplier for multiplying the second horizontal color signal non-correlative energy by a predetermined third constant and for outputting the multiplying result;

a fourth multiplier for multiplying the horizontal brightness signal non-correlative energy by a predetermined fourth constant, different from the second constant, and for outputting the multiplied result;

a fifth multiplier for multiplying the first vertical color signal non-correlative energy by a predetermined fifth constant and for outputting the multiplied result;

a sixth multiplier for multiplying the vertical brightness signal non-correlative energy by a predetermined sixth constant and for outputting the multiplied result;

a seventh multiplier for multiplying the second vertical color signal non-correlative energy by a predetermined seventh constant and for outputting the multiplied result;

an eighth multiplier for multiplying the vertical brightness signal non-correlative energy by a predetermined eighth constant, different from the sixth constant, and for outputting the multiplied result;

a first maximum value circuit for comparing the output of said first multiplier to the output of said second multiplier, and for selecting and outputting the larger as the first comparative signal;

an adder for adding the output of said third multiplier to the output of said fourth multiplier;

a second maximum value circuit for comparing the output of said fifth multiplier with the output of said sixth multiplier, and for selecting and outputting the larger as the third comparative signal;

a third maximum value circuit for comparing the output of said seventh multiplier with the output of said eighth multiplier, and for selecting and outputting the larger;

a ninth multiplier for multiplying the output of said adder by a predetermined ninth constant and for outputting the multiplied result as the second comparative signal;

a tenth multiplier for multiplying the output of said third maximum value circuit by a predetermined tenth constant and for outputting the multiplied result as the fourth comparative signal.

21. A brightness signal/color signal separating filter according to claim 17, wherein said comparative signal generating means comprises:

a first adder for adding the first horizontal color signal non-correlative energy with the horizontal brightness signal non-correlative energy and for outputting the added result as the first comparative signal;

a second adder for adding the second horizontal color signal non-correlative energy with the horizontal brightness signal non-correlative energy and for outputting the added result;

a third adder for adding the first vertical color signal non-correlative energy with the vertical color brightness signal non-correlative energy and for outputting the added result as the third comparative signal;

a fourth adder for adding the second vertical color signal non-correlative energy with the vertical brightness signal non-correlative energy and for outputting the added result;

a first multiplier for multiplying the output of said second adder by a predetermined first coefficient and for outputting the multiplied result as the second comparative signal;

a second multiplier for multiplying the output of said fourth adder by a predetermined second coefficient and for outputting the multiplied result as the fourth comparative signal.

22. A brightness signal/color signal separating filter according to claim 17, wherein said comparative signal generating means comprises:

a first adder for adding the first horizontal color signal non-correlative energy with the horizontal brightness signal non-correlative energy and for outputting the added result as the first comparative signal;

a first multiplier for multiplying the second horizontal color signal non-correlative energy by a predetermined first coefficient and for outputting the multiplied result;

a second multiplier for multiplying the horizontal brightness signal non-correlative energy by a predetermined second coefficient and for outputting the multiplied result;

a first maximum value circuit for comparing the output of said first multiplier with the output of said second multiplier, and for selecting and outputting the larger;

a second adder for adding the first vertical color signal non-correlative energy with the vertical brightness signal non-correlative energy and for outputting the added result as the third comparative signal;

a third multiplier for multiplying the second vertical color signal non-correlative energy by a predetermined third coefficient and for outputting the multiplied result;

a fourth multiplier for multiplying the vertical brightness signal non-correlative energy by a predetermined fourth coefficient and for outputting the multiplied result;

a second maximum value circuit for comparing the output of said third multiplier with the output of said fourth multiplier, and for selecting and outputting the larger;

a fifth multiplier for multiplying the output of said first maximum value circuit by a predetermined fifth coefficient and for outputting the multiplied result as the second comparative signal;

a sixth multiplier for multiplying the output of said second maximum value circuit by a predetermined sixth coefficient and for outputting the multiplied result as the fourth comparative signal.

23. A brightness signal/color signal separating filter for separating a brightness signal and a color signal from an input composite color television signals, comprising:

means for extracting a sampled value at both a target sampling point and a plurality of reference sampling points proximate to the target sampling point from predetermined lines of the input composite color television signal, synchronously, with a horizontal scanning frequency;

a horizontal color signal extracting filter for producing a first color signal by extracting a component having a color sub-carrier frequency in a horizontal direction relative to sampled values of predetermined sampling points;

a vertical color signal extracting filter for producing a second color signal by extracting a component having a color sub-carrier frequency in a vertical direction relative to sampled values of predetermined sampling points;

a horizontal/vertical color signal extracting filter for producing a third color signal by extracting a component having a color sub-carrier frequency in both vertical and horizontal directions relative to sampled values of each of predetermined sampling points;

a switching circuit for producing an output as a separated color signal by selecting one of the first, the second and the third color signal;

an image correlation judging circuit for outputting a selection signal by detecting image correlations along the vertical and the horizontal directions, respectively, from the sampled values of predetermined sampling points;

a brightness extraction circuit producing a brightness signal from the separated color signal and the composite color television signal;

said image correlation judging circuit further including, non-correlative energy extracting means for extracting horizontal color signal non-correlative energy representative of correlative strength of the color signal in horizontal direction, horizontal brightness signal non-correlative energy representative of correlative strength of the brightness signal in horizontal direction, vertical color signal non-correlative energy representative of correlative strength of the color signal in vertical direction, and vertical brightness signal) non-correlative energy representative of correlative strength of the brightness signal in vertical direction;

comparative signal generating means for generating comparative signals by detecting a degree of image correlations in the vertical direction and in the horizontal direction, respectively, based upon horizontal color signal non-correlative energy, horizontal brightness signal non-correlative energy, vertical color signal non-correlative energy, and vertical brightness signal non-correlative energy; and comparative judging means for controlling the switching circuit by judging image correlation from the generated comparative signals in such a manner that the first color signal is selected in a case of the weak correlation in the vertical direction, the second color signal is selected in a case of the weak correlation in the horizontal direction, and the third color signal is selected upon neither of the first and second cases being satisfied.

24. A brightness signal/color signal separating filter comprising:

means for delaying a composite video signal which is sampled at a frequency synchronous with a horizontal scanning frequency by one or two lines and simultaneously extracting the sampled values at the object sampling point and a plurality of reference sampling points in the vicinity thereof;

a horizontal color signal extracting filter for extracting the frequency component which corresponds to a color subcarrier frequency component in the horizontal scanning direction on the basis of the sampled values at the respective sampling points and outputting the extracted component as a first color signal;

a vertical color signal extracting filter for extracting the frequency component which corresponds to a color subcarrier frequency component in the vertical scanning direction on the basis of the sampled values at the respective sampling points and outputting the extracted component as a second color signal;

a horizontal/vertical color signal extracting filter for extracting the frequency component which corresponds to a color subcarrier frequency component in the horizontal scanning direction and the vertical scanning direction on the basis of the sampled values at the respective sampling points and outputting the extracted component as a third color signal;

a switching circuit for selecting one from said first color signal, said second color signal and said third color signal and outputting the selected signal as a separated color signal;

image correlation judging means for outputting a color signal selection signal by detecting the image correlations in the vertical and horizontal scanning directions, respectively, from the sampled values of the respective sampling points; and a brightness extraction circuit using the separated color signal and the sampled values at the respective sampling points and producing a separated brightness signal therefrom;

said image correlation judging means including;

horizontal brightness signal non-correlative energy detecting means for detecting the correlation strength of the brightness signal in the horizontal scanning direction from the sampled values at the respective sampling points;

horizontal color signal non-correlative energy detecting means for detecting the correlation strength of the color signal in the horizontal scanning direction;

vertical brightness signal non-correlative energy detecting means for detecting the correlation strength of the brightness signal in the vertical scanning direction;

vertical color signal non-correlative energy detecting means for detecting the correlation strength of the color signal in the vertical scanning direction;

a comparative signal generating means for comparing the vertical non-correlation with the horizontal non-correlation on the basis of the horizontal brightness signal non-correlative energy, horizontal color signal non-correlative energy, vertical brightness signal non-correlative energy and vertical color signal non-correlative energy and supplying a first comparative signal to said switching circuit when the vertical non-correlation is judged to be a predetermined amount greater than the horizontal non-correlation, a second comparative signal when the horizontal non-correlation is judged to be a predetermined amount greater than the vertical non-correlation, and a third comparative signal when neither of the above two conditions exist; and color signal extracting means for controlling said switching circuit so as to select said first color signal, said second color signal and said third color signal when the comparative signals received from said comparative signal generating means are said first comparative signal, said second comparative signal and said third comparative signal, respectively.

25. The brightness signal/color signal separating filter of claim 24 wherein said means for delaying includes, a first delay circuit for outputting a first delay composite television signal generated by delaying the input composite color signal by a predetermined number of lines;

a second delay circuit for outputting a second delay composite color television signal generated by further delaying the input composite color signal delayed by said first delay circuit by an equal number of lines as delayed in said first delay circuit.

26. A brightness signal/color signal separating filter according to claim 24, wherein said composite video signal is an NTSC (National Television System Committee) signal.

27. The brightness signal/color signal separating filter of claim 24 further comprising compensating delay means disposed between said switching circuit and said horizontal, vertical and horizontal/vertical color signal extracting filters.

28. A brightness signal/color signal separating filter comprising:

means for delaying a composite video signal which is sampled at a frequency synchronous with a horizontal scanning frequency by one or two lines and simultaneously extracting the sampled values at the object sampling point and a plurality of reference sampling points in the vicinity thereof;

a horizontal color signal extracting filter for extracting the frequency component which corresponds to a color subcarrier frequency component in the horizontal scanning direction on the basis of the sampled values at the respective sampling points and outputting the extracted component as a first color signal;

a vertical color signal extracting filter for extracting the frequency component which corresponds to a color subcarrier frequency component in the vertical scanning direction on the basis of the sampled values at the respective sampling points and outputting the extracted component as a second color signal;

a horizontal/vertical color signal extracting filter for extracting the frequency component which corresponds to a color subcarrier frequency component in the horizontal scanning direction and the vertical scanning direction on the basis of the sampled values at the respective sampling points and outputting the extracted component as a third color signal;

a switching circuit for selecting one from said first color signal, said second color signal and said third color signal and outputting the selected signal as a separated color signal;

image correlation judging means for outputting a color signal selection signal by detecting the image correlations in the vertical and horizontal scanning directions, respectively, from the sampled values of the respective sampling points; and a brightness extraction circuit using the separated color signal and the sampled values at the respective sampling points and producing a separated brightness signal therefrom;

said image correlation judging means including;

horizonal brightness signal non-correlative energy detecting means for detecting the correlation strength of the brightness signal in the horizontal scanning direction from the sampled values at the respective sampling points;

horizontal color signal non-correlative energy detecting means for detecting the correlation strength of the color signal in the horizontal scanning direction;

vertical brightness signal non-correlative energy detecting means for detecting the correlation strength of the brightness signal in the vertical scanning direction;

vertical color signal non-correlative energy detecting means for detecting the correlation strength of the color signal in the vertical scanning direction;

at least one horizontal non-correlative energy detection means for detecting a horizontal non-correlative energy DH from said horizontal brightness signal non-correlative energy and said horizontal color signal non-correlative energy;

at least one vertical non-correlative energy detecting means for detecting a vertical non-correlative energy DV from said vertical brightness signal non-correlative energy and said vertical color signal non-correlative energy;

comparative signal generating means for supplying a first comparative signal to said switching circuit when a first expression $DV \geq m \cdot DH$ is satisfied (where m: a predetermined coefficient), for supplying a second comparative signal when a second expression $DH \geq n \cdot DV$ is satisfied (where n: a predetermined coefficient), and a third comparative signal when neither of the first and second expressions is satisfied; and color signal extracting means for controlling said switching circuit so as to select said first color signal, said second color signal and said third color signal when the comparative signals received from said comparative signal generating means are said first comparative signal, said second comparative signal and said third comparative signal, respectively.

29. The brightness signal/color signal separating filter of claim 28 wherein said horizontal non-correlative energy detecting means includes a first horizontal non-correlative energy detector detecting a first horizontal non-correlative energy DHa and a second horizontal non-correlative energy detector detecting a second horizontal non-correlative energy DHb, said comparative signal generating means alternately using Dha and Dhb in each of said first and second expressions.

30. The brightness signal/color signal separating filter of claim 28 wherein said vertical non-correlative energy detecting means includes a first vertical non-correlative energy detector detecting a first vertical non-correlative energy DVa and a second vertical non-correlative energy detector detecting a second vertical non-correlative energy DVb, said comparative signal generating means alternately using Dva and Dvb in each of said first and second equations.

31. The brightness signal/color signal separating filter of claim 28 wherein said horizontal non-correlative energy detecting means includes a first horizontal non-correlative energy detector detecting a first horizontal non-correlative energy Dha and a second horizontal non-correlative energy detector detecting a second horizontal non-correlative energy Dhb, said vertical non-correlative energy detecting means including a first vertical non-correlative energy detector detecting a first vertical non-correlative energy Dva and a second vertical non-correlative energy detector detecting a second vertical non-correlative energy Dvb, said comparative signal generating means alternately using Dha and Dhb in each of said first and second equations and further alternately using Dva and Dvb in each of said equations.

32. The brightness signal/color signal separating filter of claim 28 wherein said means for delaying includes, a first delay circuit for outputting a first delay composite television signal generated by delaying the input composite color signal by a predetermined number of lines;

a second delay circuit for outputting a second delay composite color television signal generated by further delaying the input composite color signal delayed by said first delay circuit by an equal number of lines as delayed in said first delay circuit.

33. A brightness signal/color signal separating filter according to claim 28, wherein said composite video signal is an NTSC (National Television System Committee) signal.

34. The brightness signal/color signal separating filter of claim 28 further comprising compensating delay means disposed between said switching circuit and said horizontal, vertical and horizontal/vertical color signal extracting filters.

35. A brightness signal/color signal separating filter comprising:

means for delaying a composite video signal which is sampled at a frequency synchronous with a horizontal scanning frequency by one or two lines and simultaneously extracting the sampled values at the object sampling point and a plurality of reference sampling points in the vicinity thereof;

a horizontal color signal extracting filter for extracting the frequency component which corresponds to a color subcarrier frequency component in the horizontal scanning direction on the basis of the sampled values at the respective sampling points and outputting the extracted component as a first color signal;

a vertical color signal extracting filter for extracting the frequency component which corresponds to a color subcarrier frequency component in the vertical scanning direction on the basis of the sampled values at the respective sampling points and outputting the extracted component as a second color signal;

a horizontal/vertical color signal extracting filter for extracting the frequency component which corresponds to a color subcarrier frequency component in the horizontal scanning direction and the vertical scanning direction on the basis of the sampled values at the respective sampling points and outputting the extracted component as a third color signal;

a switching circuit for selecting one from said first color signal, said second color signal and said third color signal and outputting the selected signal as a separated color signal;

image correlation judging means for outputting a color signal selection signal by detecting the image correlations in the vertical and horizontal scanning directions, respectively, from the sampled values of the respective sampling points; and a brightness extraction circuit using the separated color signal and the sampled values at the respective sampling points and producing a separated brightness signal thererom;

said image correlation judging means including;

horizontal brightness signal non-correlative energy detecting means for detecting the correlation strength of the brightness signal in the horizontal scanning direction from the sampled values at the respective sampling points;

horizontal color signal non-correlative energy detecting means for detecting the correlation strength of the color signal in the horizontal scanning direction;

vertical brightness signal non-correlative energy detecting means for detecting the correlation strength of the brightness signal in the vertical scanning direction;

vertical color signal non-correlative energy detecting means for detecting the correlation strength of the color signal in the vertical scanning direction;

at least one horizontal non-correlative energy detecting means for outputting the maximum value of said horizontal brightness signal non-correlative energy multiplied by an integral number and said horizontal color signal non-correlative energy multiplied by an integral number as a horizontal non-correlative energy;

at least one vertical non-correlative energy detecting means for outputting the maximum value of said vertical brightness signal non-correlative energy multiplied by an integral number and said vertical color signal non-correlative energy multiplied by an integral number as a vertical non-correlative energy;

comparative signal generating means for comparing said vertical non-correlation energy with said horizontal non-correlative energy and supplying a first comparative signal to said switching circuit when said vertical non-correlation energy is judged to be a predetermined amount greater than said horizontal non-correlation energy, a second comparative signal when said horizontal non-correlation energy is judged to be a predetermined amount greater than said vertical non-correlation energy, and a third comparative signal when neither of the above two conditions exist; and color signal extracting means for controlling said switching circuit so as to select said first color signal, said second color signal and said third color signal when the comparative signals received from said comparative signal generating means are said first comparative signal, said second comparative signal and said third comparative signal, respectively.

36. The brightness signal/color signal separating filter of claim 35 wherein said means for delaying includes, a first delay circuit for outputting a first delay composite television signal generated by delaying the input composite color signal by a predetermined number of lines;

a second delay circuit for outputting a second delay composite color television signal generated by further delaying the input composite color signal delayed by said first delay circuit by an equal number of lines as delayed in said first delay circuit.

37. A brightness signal/color signal separating filter according to claim 35, wherein said composite video signal is an NTSC (National Television System Committee) signal.

38. The brightness signal/color signal separating filter of claim 35 further comprising compensating delay means disposed between said switching circuit and said horizontal, vertical and horizontal/vertical color signal extracting filters.

39. A brightness signal/color signal separating filter for separating a brightness signal and a color signal from an input composite color television signals, comprising:

means for extracting a sampled value at both a target sampling point and a plurality of reference sampling points proximate to the target sampling point from predetermined lines of the input composite color television signal, synchronously, with a horizontal scanning frequency;

a first directional color signal extracting filter for producing a first color signal by extracting a component having a color sub-carrier frequency in a first direction relative to sampled values of predetermined sampling points;

a second directional color signal extracting filter for producing a second color signal by extracting a component having a color sub-carrier frequency in a second direction, different from said first direction relative to sampled values of predetermined sampling points;

a switching circuit for producing an output as a separated color signal by selecting one of said color signals;

an image correlation judging circuit for outputting a selection signal by detecting image correlations along the first and second directions, respectively, from the sampled values of predetermined sampling points;

a brightness extraction circuit producing a brightness signal from the separated color signal and the composite color television signal;

said image correlation judging circuit further including, non-correlative energy extracting means for extracting horizontal color signal non-correlative energy representative of correlative strength of the color signal in the horizontal direction, horizontal brightness signal non-correlative energy representative of correlative strength of the brightness signal in the horizontal direction, vertical color signal non-correlative energy representative of correlative strength of the color signal in the vertical direction, and vertical brightness signal non-correlative energy representative of correlative strength of the brightness signal in said vertical direction;

comparative signal generating means for generating comparative signals by detecting a degree of image correlations in the horizontal and vertical directions, respectively, based upon horizontal color signal non-correlative energy, horizontal brightness signal non-correlative energy, vertical color signal non-correlative energy, and vertical brightness signal non-correlative energy; and comparative judging means for controlling the switching circuit by judging image correlation from the generated comparative signals in order to select the dimension of least correlation.

40. The brightness signal/color signal separating filter of claim 39 wherein said first and second directions are selected from horizontal, vertical, and horizontal/vertical.

41. A brightness signal/color signal separating filter comprising:

means for delaying a composite video signal which is sampled at a frequency synchronous with a horizontal scanning frequency by one or two lines and simultaneously extracting the sampled values at the object sampling point and a plurality of reference sampling points in the vicinity thereof;

a first directional color signal extracting filter for extracting the frequency component which corresponds to a color subcarrier frequency component in a first direction on the basis of the sampled values at the respective sampling points and outputting the extracted component as a first color signal;

a second directional color signal extracting filter for extracting the frequency component which corresponds to a color subcarrier frequency component in a second direction, different from said first direction, on the basis of the sampled values at the respective sampling points and outputting the extracted component as a second color signal;

a switching circuit for selecting one of said color signals, and outputting the selected signal as a separated color signal;

image correlation judging means for outputting a color signal selection signal by detecting the image correlations in the first and second directions, respectively, from the sampled values of the respective sampling points; and a brightness extraction circuit using the separated color signal and the sampled values at the respective sampling points and producing a separated brightness signal therefrom;

said image correlation judging means including, horizontal brightness signal non-correlative energy detecting means for detecting the correlation strength of the brightness signal in the horizontal direction from the sampled values at the respective sampling points;

horizontal color signal non-correlative energy detecting means for detecting the correlation strength of the color signal in the horizontal direction;

vertical brightness signal non-correlative energy detecting means for detecting the correlation strength of the brightness signal in the second direction;

vertical color signal non-correlative energy detecting means for detecting the correlation strength of the color signal in the vertical direction;

comparative signal generating means for generating comparative signals by detecting a degree of image correlations in the first and second directions, respectively, based upon the horizontal color signal non-correlative energy, horizontal brightness signal non-correlative energy, vertical color signal non-correlative energy, and vertical brightness signal non-correlative energy, and for controlling the switching circuit by judging image correlation from the generated comparative signals in order to select the dimension of least correlation; and color signal extracting means for controlling said switching circuit so as to select one of said color signals based on the dimension of least correlation.

42. The brightness signal/color separating filter of claim 41 wherein said first and second directions are selected from horizontal, vertical, and horizontal/vertical.

43. The brightness signal/color signal separating filter of claim 41 wherein said means for delaying includes, a first delay circuit for outputting a first delay composite television signal generated by delaying the input composite color signal by a predetermined number of lines;

a second delay circuit for outputting a second delay composite color television signal generated by further delaying the input composite color signal delayed by said first delay circuit by an equal number of lines as delayed in said first delay circuit.

44. A brightness signal/color signal separating filter according to claim 41, wherein said composite video signal is an NTSC (National Television System Committee) signal.

45. The brightness signal/color signal separating filter of claim 41 further comprising compensating delay means disposed between said switching circuit and said first and second color signal extracting filters.

46. A brightness signal/color signal separating filter comprising:

means for delaying a composite video signal which is sampled at a frequency synchronous with a horizontal scanning frequency by one or two lines and simultaneously extracting the sampled values at the object sampling point and a plurality of reference sampling points in the vicinity thereof;

a first directional color signal extracting filter for extracting the frequency component which corresponds to a color subcarrier frequency component in a first direction on the basis of the sampled values at the respective sampling points and outputting the extracted component as a first color signal;

a second directional color signal extracting filter for extracting the frequency component which corresponds to a color subcarrier frequency component in a second direction, different from said first direction on the basis of the sampled values at the respective sampling points and outputting the extracted component as a second color signal;

a switching circuit for selecting one of said color signals and outputting the selected signal as a separated color signal;

image correlation judging means for outputting a color signal selection signal by detecting the image correlations in the horizontal and vertical scanning directions, respectively, from the sampled values of the respective sampling points; and a brightness extraction circuit using the separated color signal and the sampled values at the respective sampling points and producing a separated brightness signal therefrom;

said image correlation judging means including;

horizontal brightness signal non-correlative energy detecting means for detecting the correlation strength of the brightness signal in the horizontal direction from the sampled values at the respective sampling points;

horizontal color signal non-correlative energy detecting means for detecting the correlation strength of the color signal in the horizontal direction;

vertical brightness signal non-correlative energy detecting means for detecting the correlation strength of the brightness signal in the vertical direction;

vertical color signal non-correlative energy detecting means for detecting the correlation strength of the color signal in the vertical direction;

horizontal non-correlative energy detecting means for outputting the maximum value of said horizontal brightness signal non-correlative energy multiplied by an integral number and said horizontal color signal non-correlative energy multiplied by an integral number as a horizontal non-correlative energy;

vertical non-correlative energy detecting means for outputting the maximum value of said vertical brightness signal non-correlative energy multiplied by an integral number and said vertical color signal non-correlative energy multiplied by an integral number as a vertical non-correlative energy;

comparative signal generating means for comparing said vertical non-correlation energy with said horizontal non-correlation energy to produce a signal representative of the lowest non-correlative energy; and color signal extracting means for controlling said switching circuit so as to select said color signal associated with said lowest non-correlation energy.

47. The brightness signal/color signal separating filter of claim 46 wherein said first and second directions are selected from horizontal, vertical, and horizontal/-vertical.

48. The brightness signal/color signal separating filter of claim 46 wherein said means for delaying includes, a first delay circuit for outputting a first delay composite television signal generated by delaying the input composite color signal by a predetermined number of lines;

a second delay circuit for outputting a second delay composite color television signal generated by further delaying the input composite color signal delayed by said first delay circuit by an equal number of lines as delayed in said first delay circuit.

49. A brightness signal/color signal separating filter according to claim 46, wherein said composite video signal is an NTSC (National Television System Committee) signal.

50. The brightness signal/color signal separating filter of claim 46 further comprising compensating delay means disposed between said switching circuit and said first and second directional color signal extracting filters.

* * * * *